US012297042B2

(12) United States Patent
Satwicz et al.

(10) Patent No.: US 12,297,042 B2
(45) Date of Patent: May 13, 2025

(54) HANDS FREE STORAGE RECEPTACLE

(71) Applicant: Big Belly Solar LLC, Needham, MA (US)

(72) Inventors: Jeffrey T. Satwicz, Waltham, MA (US); Kevin Menice, Medfield, MA (US); David J. Skocypec, Stoughton, MA (US); Thomas Olsen, Natick, MA (US); Brian Phillips, Sherborn, MA (US); Michael E. Feldman, Framingham, MA (US)

(73) Assignee: BIG BELLY SOLAR LLC, Needham, MA (US)

( * ) Notice: Subject to any disclaimer, the term of this patent is extended or adjusted under 35 U.S.C. 154(b) by 0 days.

(21) Appl. No.: 18/369,240

(22) Filed: Sep. 18, 2023

(65) Prior Publication Data

US 2024/0002146 A1 Jan. 4, 2024

Related U.S. Application Data

(60) Continuation of application No. 17/963,469, filed on Oct. 11, 2022, now Pat. No. 11,760,566, which is a (Continued)

(51) Int. Cl.

*B65F 1/16* (2006.01)
*B30B 9/30* (2006.01)

(Continued)

(52) U.S. Cl.

CPC .............. *B65F 1/163* (2013.01); *B30B 9/301* (2013.01); *B65F 1/10* (2013.01); *B65F 1/1426* (2013.01);

(Continued)

(58) Field of Classification Search

CPC .......... B65F 1/163; B65F 1/10; B65F 1/1426; B65F 1/1438; B65F 1/1405; B65F 1/1623; B65F 2001/1661; B65F 2210/124; B65F 2210/128; B65F 2210/1443; B65F 2210/1525; B65F 2210/168; B65F 2210/172; B65F 2210/20; B65F 1/16; B65F 1/04; B65F 9/30

See application file for complete search history.

(56) References Cited

U.S. PATENT DOCUMENTS 1,763,756 A 6/1930 Casapollo
2,665,868 A 1/1954 Schmidt (Continued)

FOREIGN PATENT DOCUMENTS

CH 676 836 3/1991
DE 91 12 093 11/1991

(Continued)

*Primary Examiner* — Robert L Deberadinis

(57) ABSTRACT

A storage receptacle can include a storage bin and a pedal mounted to the receptacle as well as a hopper. A method of using the storage receptacle can include receiving a force on a hopper handle of a hopper of a storage receptacle, the hopper having a cable connection point connected to a cable, based on the force, rotating the hopper to enable a user to place material in a storage bin of the storage receptacle, wherein the rotating causes the cable to have slack and preventing the cable having the slack from coming out of a groove in a pulley via a shroud positioned over at least a portion of the pulley.

20 Claims, 24 Drawing Sheets

Related U.S. Application Data division of application No. 16/734,510, filed on Jan. 6, 2020, now Pat. No. 11,465,837, which is a division of application No. 15/014,519, filed on Feb. 3, 2016, now Pat. No. 10,526,138.

(60) Provisional application No. 62/212,704, filed on Sep. 1, 2015, provisional application No. 62/111,202, filed on Feb. 3, 2015.

(51) Int. Cl.
*B65F 1/10* (2006.01)
*B65F 1/14* (2006.01)

(52) U.S. Cl.
CPC .......... *B65F 1/1638* (2013.01); *B65F 1/1405* (2013.01); *B65F 1/1623* (2013.01); *B65F 2001/1661* (2013.01); *B65F 2210/124* (2013.01); *B65F 2210/128* (2013.01); *B65F 2210/1443* (2013.01); *B65F 2210/1525* (2013.01); *B65F 2210/168* (2013.01); *B65F 2210/172* (2013.01); *B65F 2210/20* (2013.01)

(56) References Cited

U.S. PATENT DOCUMENTS

| | | | |
|---|---|---|---|
| 2,862,443 | A | 12/1958 | Strong |
| 2,887,040 | A | 5/1959 | Strong |
| 5,195,649 | A | 3/1993 | Wolters |
| 5,671,859 | A | 9/1997 | Sheu |
| 6,209,744 | B1 | 4/2001 | Gill |
| 6,581,587 | B1 | 6/2003 | Helms |
| 10,526,138 | B2 | 1/2020 | Satwicz |
| 2003/0183633 | A1 | 10/2003 | Pope |
| 2006/0283929 | A1 | 12/2006 | Lim |
| 2007/0068942 | A1 | 3/2007 | Smudde |
| 2011/0120997 | A1 | 5/2011 | Most |
| 2014/0172174 | A1 | 6/2014 | Poss et al. |

FOREIGN PATENT DOCUMENTS

| | | |
|---|---|---|
| EP | 1 493 688 | 1/2005 |
| GB | 669 445 | 4/1952 |
| GB | 2385260 | 8/2003 |

HANDS FREE STORAGE RECEPTACLE

CROSS-REFERENCE TO RELATED APPLICATIONS

The present application is a continuation of U.S. patent application Ser. No. 17/963,469, filed Oct. 11, 2022, which is a division of U.S. patent application Ser. No. 16/734,510, filed Jan. 6, 2020, which is a division of U.S. patent application Ser. No. 15/014,519, filed Feb. 3, 2016, which claims the benefit of priority of U.S. Provisional Application No. 62/212,704, filed on Sep. 1, 2015, entitled "HANDS FREE STORAGE RECEPTACLE"; and U.S. Provisional Application No. 62/111,202, filed on Feb. 3, 2015, entitled "HANDS FREE STORAGE RECEPTACLE"; both of which are expressly incorporated by reference herein in their entirety.

BACKGROUND

1. Technical Field

The present disclosure relates to trash receptacles and more specifically to hands free interfaces for trash receptacles and compactors and associated technologies.

2. Introduction

Public space waste compactors and receptacles are used by most communities to allow for simple and convenient waste disposal. To this end, waste compactors and receptacles are strategically placed throughout an area to maximize public access and limit pollution and litter. Proper disposal of public waste can help keep a community clean.

Public space compactors are popular because they are efficient and help maximize space. However, the compaction mechanism can be dangerous to the public if used or designed improperly. Thus, public space compactors should be safe and secure to avoid damage and injury. Moreover, doors and handles on public waste compactors typically require user interaction with a hand or similar object. Such interactions can spread contamination, particularly in dense areas. Unfortunately, conventional systems lack safe and effective mechanisms designed to prevent user contamination through public interaction with current public space compactors and receptacles.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. Any individual step or structure disclosed herein can be combined or intermixed with any other step or structure.

The approaches set forth herein can be used to provide safe and secure public space waste compactors and receptacles. For example, the compactors can have a hopper door to keep the public and compaction mechanism separated in order to ensure safety and security. Moreover, to improve the user's experience and prevent contamination, a hands free interface or structure can be implemented. The hands free interface can be implemented with the hopper door to ensure safety while preventing contamination. In some cases, the hands free interface can be implemented through a pedal which can be activated by the user's foot. For example, when a user steps on the pedal, an internal mechanism causes the hopper door to rotate to the open position and allow the user to dispose materials in the waste compactor. A release of pressure on the pedal can then cause the hopper door to close. The following disclosure covers a variety of innovations in the area of storage or trash receptacles and how they function. One concept covers the underlying hands free operation. Other innovations address aspects of the hands free structure such as bumpers to prevent damage, a new spring structure as part of the hands free mechanism, and energy reclamation components for solar powered compactors. A summary of these various aspects is presented next.

Hands Free Storage Receptacle

Disclosed are hand free mechanisms for waste compactors and receptacles. A storage receptacle can include a storage bin for holding deposited items. A pedal can be mounted to the storage receptacle, the pedal being configured to rotate downward when pressure is applied in order to pull on a cable coupled to the pedal. The storage receptacle can include the cable, which can be coupled to the pedal on a first end and coupled to a door of the storage receptacle on a second end, wherein the cable causes the door to open when the cable is pulled based on force applied to the pedal. A bottom pulley can be coupled to the pedal and configured to translate an upward pull of the cable to a downward pull of the cable. A spring in a portion of the cable can divide the cable into a bottom cable and a top cable. An upper pulley coupled to the door can be configured to translate the downward pull of the cable to the upward pull on the door. A connection point on the door can couple the cable with the door in order to force a motion of the door when force is applied to the pedal. The spring performs a function of controlling or limiting the movement of the door when the force is applied to the pedal. Too much force on the pedal will result in the force applied to the spring being great enough to cause the spring to begin extend rather than the door being pull open to quickly. In other words, if the cable were directly connecting the foot pedal to the door, then there would be no give in the system and stepping hard on the pedal would cause the door to open too quickly.

Another aspect of the cabling system is as follows. A storage receptacle includes a storage bin for holding deposited items and a pedal mounted to the storage receptacle. The pedal can be configured to rotate downward when force is applied resulting in a downward force on a first cable via interaction with a first pulley. The pedal can further include a first end on which the force is applied to rotate the pedal downward and a second end to which an end of the first cable is attached such that when the first end of the pedal rotates downward, the second end rotates upward, thus causing the end of the first cable to pull upwards on the first end of the cable, wherein the first cable, by virtue of being around the pulley, has its second end pulled downward. A spring can be coupled with first cable, wherein a bottom end of the spring is coupled with a top end of first cable. The spring limits and/or controls the forces applied to the pedal such that the door of the device opens more slowly. A second cable attached to a top end of the spring, the second cable coupled via a second pulley with a hopper which when open, enables a user to put materials into the storage bin.

A method aspect includes receiving a downward force applied to a first end of a pedal, the pedal configured on a lower portion of a side wall of a storage receptacle. The method includes converting the downward force applied to the first end of the pedal to a downward force applied to a spring, a first cable mechanically connecting a second end of the pedal with the spring. Next, the method includes converting the downward force applied to the spring to a force on a connecting point of a hopper of the storage receptacle via a second cable connecting the spring with the hopper and, as a result of the force on the connecting point of the hopper, opening the hopper to receive material into the storage receptacle. A release of pressure on the pedal can also result in the door closing. A pulley system can be incorporated to convert the forces into the proper direction. The spring functions to control and forces applied to the door and thus to make the door open in a more controlled manner. The spring can be uniform in its structure or have portions with differing structures.

Pedal and Frame Structure

The present disclosure also covers other aspects of a storage receptacle. For example, a particular structure of the pedal is described. In this aspect, an apparatus includes a frame attached to a side wall of a container or the apparatus. The frame can have a frame side surface configured to be at a first angle relative to the side wall that is greater than 90 degrees and the frame side surface defining a plane extending from the frame side surface. The side frame surface is angled as described to address a potential issue of the storage receptacle being placed on a street such that after a snowstorm, a truck plowing the street could come to close to the storage container and clip the side frame surface. Rather than allowing the plow on the truck to catch the frame and/or the pedal, the side frame surface is angled to enable the plow to more easily slide off of the frame and reduce the likelihood of damage to the frame, the pedal or the container.

The foot pedal can be rotatably configured within the frame and have a foot pedal surface configured to be stepped on by a user. The foot pedal can have a foot pedal side surface configured to be one of (1) at least in part substantially within the plane extending from the frame side surface and at the first angle relative to the side wall of the container and (2) at least in part at a second angle which is greater than the first angle relative to the side wall of the container. In this manner, if a snow plow impacts the frame and/or the foot pedal, the foot pedal side surface can be configured to reduce the possibility that the plow will catch the pedal and damage the foot pedal or apparatus. Moreover, by rotating downward, the pedal limits the ability of a user to stand on the pedal, which could cause potential damage.

The foot pedal can be rigidly mounted on the storage receptacle. The cable can be coupled to an end of the pedal as previously explained. In some examples, the cable can be a steel cable. However, in other examples, the cable can be any other material capable of handling the force for opening the door. When the pedal rotates downward, in some examples it can pull up on the cable. One or more pulleys can then translate the upward pull of the cable into a downward pull of the door.

Bumper System

Another aspect of this disclosure relates to an improvement in the cabling system of a storage receptacle. In one aspect of a hands free operation, when a user steps on a foot pedal, a linked cabling and spring system causes a hopper to open. Depending on the location and structure of the cabling system within the storage receptacle, movement of the cables and/or spring can bump up against a side wall or other structure within the receptacle. This noise can be bothersome to users. In some instances, the sound may lead users to believe that the system is not working properly because of the clanging sound from inside the receptacle. Accordingly, one disclosed aspect is a novel bumper system to help prevent or reduce such noise.

An example system includes a storage receptacle having a pedal mounted to the storage receptacle, the pedal being configured to rotate downward when force is applied resulting in a downward force on a first cable via interaction with a first pulley. The spring can be coupled with the first cable. For example, a bottom end of the spring can be coupled with a top end of the first cable.

The system can include a second cable coupled with a top end of the spring, a second pulley, and a door configured to open in response to the pedal rotating downward when the force is applied on the pedal. The second cable can be coupled with the door via a coupling point on the door, for example.

The system can also include a first bumper coupled with the second cable at a bottom location on the second cable. The bottom location can be above the spring and a first connection point that couples the second cable with the spring. Moreover, the system can include a second bumper coupled with the first cable at a top location on the first cable. The top location can be below the spring and a second connection point that couples the first cable with the spring.

The two bumpers can be the same shape and material, or be of different shapes and/or materials. For example, the bumpers can be cylindrical, cubic, pyramidal, tire-shaped, disk shaped, bone-shaped or any other shape. The bumpers can also be tapered or have otherwise varying shapes. The bumpers can be configured to have a larger diameter than a diameter of the spring. The bumper system can include one or more bumpers positioned along a cabling system for preventing or reducing contact of a spring or other component of the cabling system with another interior surface or structure of the receptacle.

Spring Configuration

Another aspect of this disclosure is the configuration of the spring. The spring can provide a decoupling of a first cable the second cable. The purpose of the decoupling is to prevent the hopper from opening to quickly if a person steps hard on the pedal. Such a quick opening of the hopper can cause injury to a child or anyone in front of the receptacle and could damage the components of the receptacle. Thus, spring can cause the hopper to open more slowly and in a more controlled manner depending on the structure of the spring.

In an example, a storage receptacle includes a pedal mounted to the storage receptacle, the pedal being configured to rotate downward when force is applied resulting in a downward force on a first cable via interaction with a first pulley. A spring can be coupled with the first cable, wherein a bottom end of the spring is coupled with a top end of the first cable. A second cable can be attached to a top end of the spring, the second cable coupled via a second pulley and/or a coupling element with a door configured to open in response to the pedal rotating downward when the force is applied on the pedal.

In another aspect, the spring can be configured such that its windings are not consistent along the entire length of the spring. For example, in a lower portion of the spring, the windings may be separated while at the upper portion of the spring, the windings may be adjacent and touching. The purpose for the changed structure is to manage the transfer of energy from the pedal to the hopper in a more controlled way when someone steps hard on the pedal. Accordingly, with a modified spring structure, a first portion of the downward energy on the spring can be absorbed by the lower portion of the spring (which has more flexibility) for the first portion of the motion and then a later portion of the downward motion is absorbed by the upper part of the spring (which has less flexibility). In this manner, the hopper will not slam open when someone steps hard on the pedal but will open in a more controlled manner.

In another aspect, the system could employ two separate springs rather than a single spring having two different portions. More than two springs could be included as well.

Pulley Shroud Configuration

Another aspect of this disclosure relates to a shroud covering one or both pulleys in the hands free mechanism. A problem occurs particularly with the upper pulley on the system when a user manually opens the hopper without using the foot pedal. The cable that is part of the upper cable can come out of the pulley track as slack develops when the user opens the hopper using the hopper handle.

An example apparatus having a pulley shroud includes a side wall of the apparatus, the side wall having, in a lower portion thereof and a foot pedal rotatably configured in the lower portion of the side wall. A cabling system includes a cable. The apparatus includes a hopper having a connection point and being configured to open and close in an upper portion of the side wall of the storage receptacle, the hopper configured such that when a user presses on the foot pedal, the cabling system causes the cable connected to the connection point on the hopper to pull up resulting in opening the hopper to enable the user to place material in a storage bin in the apparatus. A pulley has a groove containing the cable. Finally, a shroud covering at least a portion of the pulley is used such that upon a user manually opening the hopper using a hopper handle and independent of using the foot pedal, thus introducing slack into the cable, the cable stays within the groove of the pulley. The shroud can have a number of configurations but generally the shroud is configured to prevent the cable from leaving the groove which not inhibiting the rotation of the pulley with the cable therein.

Energy Reclamation System

A disclosed system and method relates to energy reclamation. The method is practiced by a storage compactor that requires stored energy to operate the compactor at various times when the storage bin is sufficiently full. The method includes receiving a mechanical force from a user. The mechanical force might be the user stepping on a pedal or opening the hopper using a handle. Each of these forces causes movement in the cabling system or rotation of a component of the system such as a pulley. The method includes converting the mechanical force into electrical energy. This can be accomplished in any number of ways. For example, the system could cause via conversion structure a flywheel to start spinning. The flywheel can include the necessary components to convert the spinning motion of the flywheel into a current that results in increasing the electrical energy stored in a battery system of the storage compactor. Each time a person uses the storage receptacle, a small amount of electrical energy can be stored in the battery system for when the proper time arrives for compacting the materials in the storage bin.

A compactor that reclaims energy includes a pedal system and a hopper in mechanical connection with the pedal system. An energy reclamation unit is mechanically connected to one of the hopper and the pedal system and a battery is electrically connected to the energy reclamation unit. When mechanical movement of one of the pedal system and the hopper which yields work, the energy reclamation unit converts the work into electricity and stores the electricity in the battery. In one aspect, the system may only reclaim energy from one of the hopper and/or the pedal system.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary examples of the disclosure and are not therefore to be considered to be limiting of its scope, the principles herein are described and explained with additional specificity and detail through the use of the accompanying drawings in which.

DETAILED DESCRIPTION

Various embodiments of the disclosure are described in detail below. While specific implementations are described, it should be understood that this is done for illustration purposes only. Other components and configurations may be used without parting from the spirit and scope of the disclosure. We note that all of the aspects disclosed herein are not be interpreted as different embodiments of this disclosure. Any particular features disclosed in an example herein can be mixed and matched with any other feature disclosed herein in other examples.

The present disclosure provides a hands free waste disposal interface and various technologies associated with improvements in such a system. A hands free waste disposal interface is disclosed which allows hands free disposal of items in a compactor or receptacle and which can keep the compaction mechanism separate from the public components.

Figure 1:
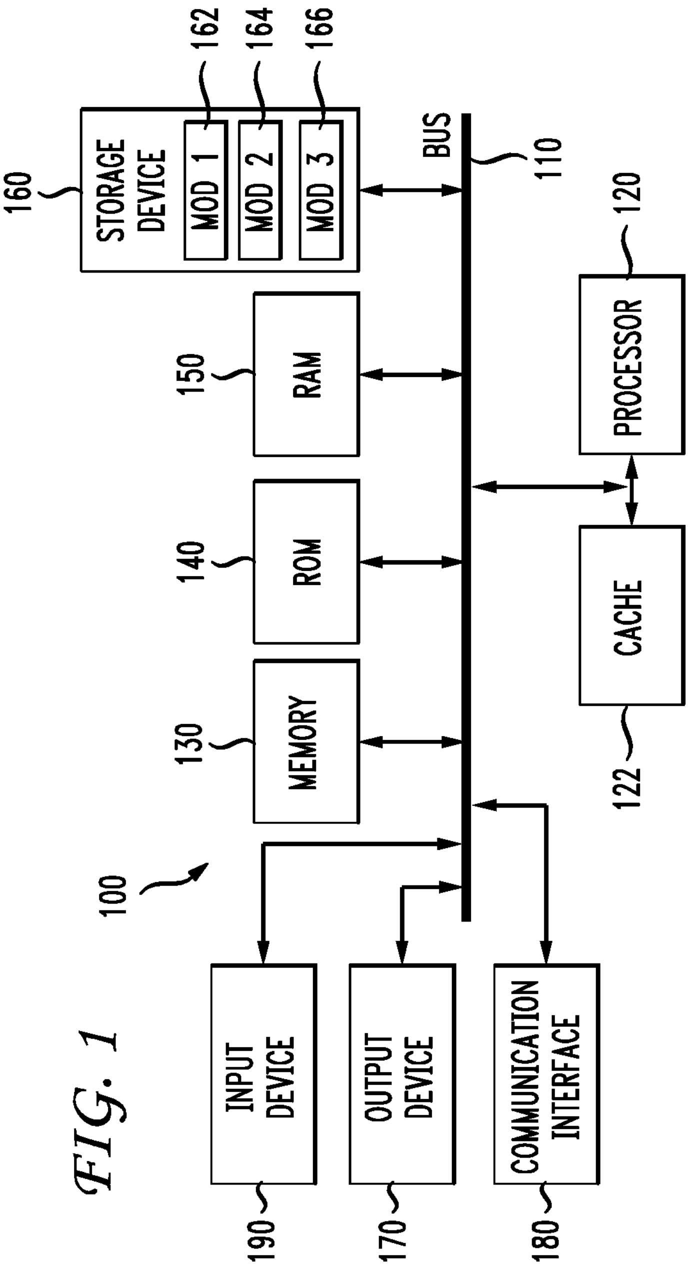
FIG. 1 illustrates an example system example.

Prior to providing a description of the hardware components of the hands free receptacle, this disclosure includes a brief introductory description of a basic general purpose system or computing device in FIG. 1, which can be employed to practice, control or manage the electrical aspects of this disclosure. A more detailed description and variations of compactors, receptacles, and hands free disposal interfaces will then follow. These variations shall be described herein as the various examples are set forth. The disclosure now turns to FIG. 1.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary examples described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system example is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 140 for storing software performing the operations described below, and random access memory (RAM) 150 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
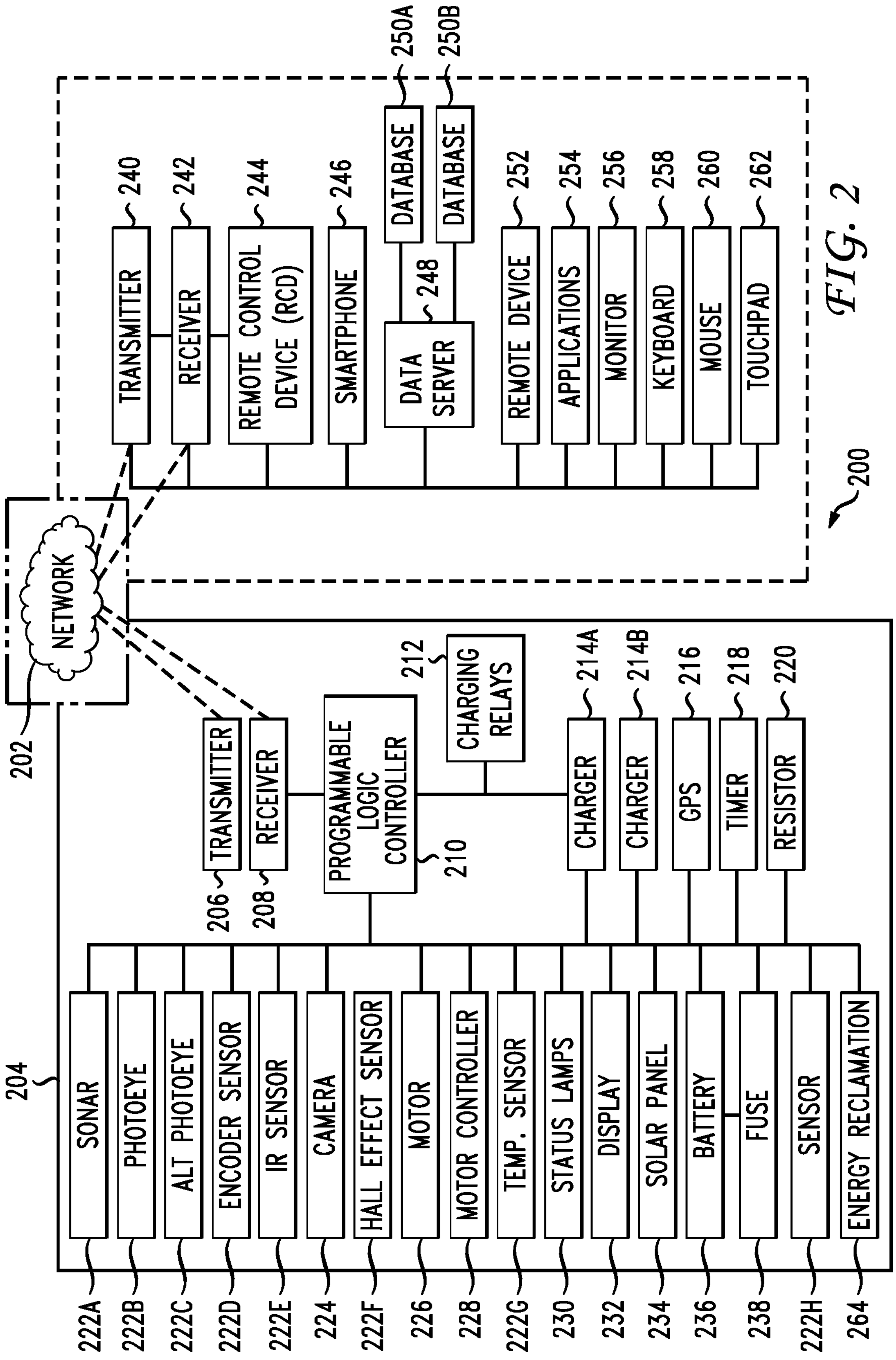
FIG. 2 illustrates an example architecture for powered compactors.

Having disclosed some components of a computing system, the disclosure now turns to FIG. 2, which illustrates an exemplary architecture for controlling electrically-powered compactors both locally and remotely via a network. Receptacle 204 can be an electrically-powered receptacle for collecting waste, such as trash and recyclables, for example. Receptacle 204 can be, for example, a solar or battery-powered receptacle and/or compactor. Moreover, receptacle 204 can include a motor 226 for performing various operations, such as compaction operations. Further, receptacle 204 can be remotely controlled using a remote control device (RCD) 244 via a network 202 or an air interface. To this end, receptacle 204 can include transmitter 206 and receiver 208 for communicating with RCD 244. In particular, transmitter 206 and receiver 208 can communicate with transmitter 240 and receiver 242 on RCD 244, and vice versa. Here, transmitters 206 and 240 can transmit information, and receivers 208 and 242 can receive information. This way, receptacle 204 and RCD 244 can be connected to transmit and receive information, such as instructions, commands, statistics, alerts, notifications, files, software, data, and so forth. Receptacle 204 can also communicate with other devices, such as a server and/or a collection vehicle, via transmitter 206 and receiver 208. Similarly, RCD 244 can communicate with other devices, such as a server and/or a user device 246, 252, via transmitter 240 and receiver 242. A protocol, such as Bluetooth, can be used in which no network other than the air interface is between the receptacle 204 and RCD 244. Thus, a user with a portable device 244 can simply get within a range for a Bluetooth communication and send a command to turn off an alarm as the user views that no-one is trying to breach into the receptacle 204.

Moreover, receptacle 204 and RCD 244 can communicate with each other and/or other devices via network 202. The network 202 can include a public network, such as the Internet, but can also include a private or quasi-private network, such as an intranet, a home network, a virtual private network (VPN), a shared collaboration network between separate entities, etc. Indeed, the network 202 can include many types of networks, such as local area networks (LANs), virtual LANs (VLANs), corporate networks, wide area networks, a cell phone transmitter and receiver, a WiFi network, a Bluetooth network, and virtually any other form of network.

Transmitter 206 and receiver 208 can be connected to printed circuit board (PCB) 210, which controls various functions on receptacle 204. In some examples, the RCD 244 can be incorporated within the PCB 210. In FIG. 2, the RCD 244 is electrically connected to the PCB 210 via transmitters 206, 240 and receivers 208, 242. The RCD 244 can be connected to transmitter 240 and receiver 242 via a two-way communication port, which includes transmitter 240 and receiver 242. The PCB 210 can control electrical functions performed by the receptacle 204. Electrical functions can include, for example, running compactions by actuating a motor 226; sensing waste or recyclables volume inside the receptacle 204 using a sensor at regular or programmable intervals, such as a sonar-based sensor 222A, a proximity sensor, and/or photoeye sensors 222B-C; changing status lamps 230 at regular and/or programmable thresholds to/from a color indicating that the receptacle 204 is not full (e.g., green), to/from a color indicating that the receptacle 204 is almost full (e.g., yellow), to/from a color indicating that the receptacle 204 is full (e.g., red); etc.

The RCD 244 can enable remote control and/or alteration of the functions performed or operated by the PCB 210. The RCD 244 can also provide access to, and control over, the various components 206, 208, 210, 212, 214A-B, 216, 218, 220, 222A-G, 224, 226, 228, 230, 232, 234, 236, 238 of the receptacle 204. Users can use a networked device, such as smartphone 246 and/or remote device 252, to communicate with the RCD 244 in order to manage and/or control the receptacle 204. For example, a user can communicate with the RCD 244 via the remote device 252 to change a threshold value on the PCB 210, which can control, for example, a collection timing; the compaction motor 226; the use of energy on a lighted advertising display, such as display 232; the status lamps 230; the sensors 222A-H; the camera 224; etc. The remote device 252 can include virtually any device with networking capabilities, such as a laptop, a portable media player, a tablet computer, a gaming system, a smartphone, a global positioning system (GPS), a smart television, a desktop, etc. In some examples, the remote device 252 can also be in other forms, such as a watch, imaging eyeglasses, an earpiece, etc.

FIG. 2 also shows an energy reclamation component 264. This component can include a number of different converters or generators that will convert mechanical movement associated with use of the compactor into electricity to be stored in the battery 236. For example, when a user steps on the foot pedal disclosed herein, the mechanical movement of the pedal, a pulley, or a cable, can cause a flywheel to spin up which, based on its continued spinning due to momentum and the use of a magnets, can generate electricity to be stored in the batter for use in compacting, communication, surveillance, WiFi services, etc. Other energy reclamation structures could be used rather than a flywheel. A generator can be used to convert any mechanical motion initiated through use of the receptacle (i.e., either via opening the hopper manually or through a footpedal) into electrical energy for storage in a storage device such as a battery or capacitor. The energy could also be directly used for compaction as well. For example, it is contemplated that in one aspect the footpedal or hopper could be switched into an active energy generation system. Assume a user desires to throw some trash away but it is night, and the bin is full. There may not be enough energy in the battery to compact but an indicator could let the user know that 10 pumps on the foot pedal would provide enough energy to compact the trash. The user could then pump the footpedal, providing the energy to the system, it could then compact the trash and the user could put in their trash into the receptacle. In this regard, if the user provides input to the system, the input could result in a mechanical delinking of the foot pedal from the hopper and just to an energy reclamation system. This could be so that the use of the foot pedal only reclaims energy and does not cause the hopper to open 10 times.

The remote device 252 and RCD 204 can be configured to automatically modify the PCB's 210 operating parameters. However, users can also manually modify the PCB's 210 operating parameters via the remote device 252 and RCD 204. The operating parameters can be modified in response to, for example, evolving industry benchmarks; user inputs; historical data, such as the data gathered from a separate database 250A-B; forecasted data, such as upcoming weather characteristics; traffic conditions; a collection schedule; a collection route; a proximity of a collection vehicle; a time and/or date; a location; a capacity, such as a capacity of the receptacle 204 and/or a capacity of a collection vehicle; a fullness state of the receptacle 204; lapsed time between collections; lapsed time between compactions; usage conditions of the receptacle 204; energy usage; battery conditions; statistics; a policy; regulations; a detected movement of an object, such as an object inside or outside of the receptacle 204; collection trends; industry and/or geographical standards; zoning policies and characteristics; real-time information; user preferences; and other data. The data from the remote device 252 can be relayed to the RCD 244, and the data from the RCD 244 can be relayed, via the network 202, to the receptacle 204 and/or the remote device 252 for presentation to the user.

The user can control the RCD 244 and/or access and modify information on the RCD 244 via a user interface, such as a web page, an application 254, a monitor 256, and/or via voice messages and commands, text messages, etc. The remote device 252 can include a user interface, which can display, for example, graphs of collection statistics and trends (e.g., collection frequency, usage, temperature, etc.), collection reports, device settings, collection schedules, collection configurations, historical data, status information, collection policies, configuration options, device information, collection routes and information, alerts, etc. This way, users can access information to make educated decisions about how to set and/or reset operating parameters on the PCB 210; to control, for example, which sensors are used to gather data, which thresholds to set; to control outputs from the status lamps 230 and other components; etc. User can change settings on the receptacle 204, such as optimal collection timing, timing of sensor actuation; and/or modify parameters, such as desired capacity and fullness thresholds; using a scroll down menu, click-and-slide tools, interactive maps displayed on the remote device 252, touch screens, forms, icons, text entries, audio inputs, text inputs, etc. In response, the RCD 244 can automatically reconfigure the PCB 210 settings, recalibrate sensors and displays, change operating parameters, etc.

The RCD 244 can include a two-way communication port that includes transmitter 240 and receiver 242, which can wirelessly communicate with the PCB 210 of the receptacle 204, via the transmitter 206 and receiver 208 on the receptacle 204, which are connected electrically to the PCB 210. On scheduled and/or programmable intervals, the PCB's 210 transmitter 206 can send data to a central server, such as data server 248, via the network 202. Moreover, the RCD's 244 receiver 242 can be configured to query the data server 248, which can also be connected to the remote device 252, for incoming data. The data server 248 can communicate data from databases 250A-B. If there is no data to be received by the receiver 208, the PCB 210 can be configured to promptly return to a low-power mode, where the transmitter 206 and receiver 208 circuits are turned off, until another scheduled, received, initiated, and/or programmed communication event. If there is data to be received by the receiver 208, such as a command to turn the receptacle 204 off and then back on, a command to change the thresholds upon which compactions are operated, a command to change the thresholds for providing status updates and/or determining fullness states, etc., then the RCD receiver 242 can download the new data from the data server 248, via the RCD 244, to the PCB 210, altering its operating configuration. The RCD receiver 242 can also be configured to send data to the data server 248 to acknowledge the receipt of data from the PCB 210, and to send selected data to the remote device 252, the smartphone 246, and/or any other device, for presentation to a user.

The data server 248 can also display the data to a user on remote device 252, smartphone 246, or any other device. The data can be a password-protected web page, a display on the smartphone 246, a display on the monitor 256, etc. Remote control using the RCD 244 to reconfigure operating thresholds, sensor use, sensor hierarchy, energy usage, etc., can enable the receptacle 204 to alter characteristics that control its energy generation, energy consumption, and/or the collection and management logistics, further enabling sound operation of the receptacle 204.

The RCD 244 can be configured to communicate over a wireless network with the PCB 210, and transmit data to the data server 248, so the data can be stored for viewing and manipulation by a user via any web-connected computer, phone, or device. The RCD 244 can also be configured to receive data from the data server 248, and transmit the data back to the PCB 210. The PCB 210 can be electrically connected to a variety of sensors, such as sensors 222A-H, within the receptacle 204. Through the RCD 244, the PCB 210 can also be wirelessly connected to the databases 250A-B, and/or other external databases, such as a weather database, which may, for example, reside on a National Oceanographic and Atmospheric (NOAA) server, a database of trucks and locations and schedules, which may reside on a waste hauler's server, a database of traffic conditions, etc. A user can also change which of the sensors 222A-H are used in setting thresholds, among other things, in response to, for example, user commands and/or changes in outside data, such as weather data or truck location data.

The PCB 210 can also communicate with a temperature sensor 222G to gather temperature information, which can be transmitted to the RCD 244 via the PCB transmitter 206. The temperature information can be used, among other things, to fine tune operational functions and energy consumption of the receptacle 204. For example, the PCB 210 can be reconfigured to run less compaction per day, such as four to eight compactions, in cold weather, since batteries are less powerful in cold weather. Coinciding with cold weather, the winter days are shorter, thus solar energy and battery power is limited. In order to conserve power on low-sunlight days, the RCD 244 can adjust the PCB's 210 normal fullness sensitivity levels, so that collections are prompted to be made earlier. For example, if the PCB 210 typically runs 20 compactions before changing status lamps from green to yellow, a signal that suggests optimal collection time, the RCD 244 can adjust the thresholds of the PCB 210 to run 10 compactions before changing from a green state to a yellow state, thus changing the total energy consumption of the compactor between collections. In a busy location, the PCB 210 can be configured to sense receptacle fullness every minute, whereas in a less busy location, the PCB 210 can be configured to sense fullness once a day.

In some examples, the RCD 244 can also alter the timing of events using algorithms based on the results of historical events. For example, the RCD 244 can be initially configured to sense fullness once per minute, but based on resulting readings, it can then alter the timing of future readings. Thus, if three consecutive readings taken at one-minute intervals yield a result of no trash accumulation, the RCD 244 can increase the timing between readings to two minutes, then three minutes, etc., based on the various readings. The RCD 244 can also be configured to adjust sensing intervals based on the level of fullness of the receptacle 204, so it would sense more frequently as the receptacle 204 fills, in order to reduce the margin of error at a critical time, before the receptacle 204 overflows. This "learning feature" can save energy by ultimately synchronizing the sensor readings with actual need to sense. The RCD 244 can also alter thresholds of status lamps 230 based on collection history, the need for capacity as determined by the frequency of red or yellow lights on the receptacle 204, temperatures, expected weather and light conditions, expected usage conditions, etc. The status lamps 230 can be LED lights, for example.

In FIG. 2, the RCD 244 can be enabled, via the PCB 210, to read, for example, a temperature sensor 222G; an encoder sensor 222D, which can measure movement of a compaction ram by utilizing an "encoder wheel" which is mounted on a motor shaft; one or more photoeye sensors 222B-C; door sensors; a sensor which measures current from the solar panel and a sensor which can measure current from the battery 236 to the motor 226; a hall effect sensor 222F, which can detect movement of, for example, a door; an infrared (IR) sensor 222E, a camera 224, etc. In addition, the thresholds set by the RCD 244 can be based on historical and real-time information, user preferences, industry norms, weather patterns and forecasts, and other information. The RCD 244 can reset the PCB's 210 normal thresholds hourly, daily, weekly, monthly, yearly, or at adjustable intervals, based on a variety of information and user decisions.

The RCD 244 can also alter the PCB's 210 normal hierarchy of sensor usage. For example, if the PCB 210 is configured to run a compaction cycle when one or more of the photoeyes 222B-C located inside the receptacle 204 are blocked, the RCD 244 can reconfigure the sensor hierarchy by reconfiguring the PCB 210 to run compaction cycles after a certain amount of time has passed, by reading the position of the encoder sensor 222D at the end of a cycle, by reading one or more photoeye sensors 222B-C, by calculating a sensor hierarchy based on historical filling rates, by a change in user preferences, etc. Using an aggregate of data from other receptacles located worldwide in a variety of settings, the RCD's 244 configurations can depend on constantly evolving parameters for optimizing energy utilization, capacity optimization, and operational behavior, among other things. The RCD 244 innovation and growing database of benchmarks, best practices and solutions to inefficiency, enables the receptacle 204 to adapt and evolve.

Based on the data from the PCB 210, the sensors, inputs by the users (e.g., the customer or the manufacturer) via the RCD 244, and/or based on other data, such as historical or weather data, the RCD 244 can change the PCB 210 thresholds, operational parameters, and/or configuration, to improve the performance of the receptacle 204 in different geographies or seasons, or based on different user characteristics or changing parameters. Thus, the system and architecture can be self-healing.

The RCD 244 can also be configured to change the PCB's 210 normal operating parameters. For example, the RCD 244 can be configured to cause the PCB 210 to run multiple compaction cycles in a row, to run energy through a resistor 220 to apply a strong load upon the battery 236, which can supply the energy. The RCD 244 can measure battery voltage at predetermined or programmable intervals, to measure the "rebound" of the battery 236. A strong battery will gain voltage quickly (e.g., the battery will almost fully recover within 15 minutes or so). A weak battery will drop significantly in voltage (e.g., 3-5 volts), will recover slowly, or will not recover to a substantial portion of its original voltage. By changing the normal parameters of the PCB 210, the battery 236 can be subjected to a heavy load during a test period, which will determine the battery's strength without jeopardizing operations. The RCD 244 can then be configured to relay a message to the user that a battery is needed, or to use the battery differently, for example, by spacing out compactions in time, reducing the degree of voltage decline within a certain time period, etc. Based on the message and any additional information from the RCD 244, the user can then order a new battery by simply clicking on a button on a web page, for example. The RCD 244 can also alter the PCB 210 to do more compactions or other energy-using functions (like downloading software) during the daytime, when solar energy is available to replenish the battery 236 as it uses energy.

Since the RCD 244 can be connected to databases, and can be informed by the PCB 210 on each receptacle of conditions or status information at the respective receptacle, the RCD 244 can also be used to relay data collected from the databases or PCB 210 for other types of servicing events. In other words, the RCD 244 can obtain, collect, maintain, or analyze status, operating, or conditions information received from the PCB 210 of one or more receptacles and/or one or more databases storing such information, and relay such data to a separate or remote device, such as a remote server or control center. For example, the RCD 244 can be configured to relay a message to a waste hauler to collect the receptacle 204 if two or more parameters are met simultaneously. To illustrate, the RCD 244 can relay a message to a waste hauler to collect the receptacle 204 if the receptacle 204 is over 70% full and a collection truck is within 1 mile of the receptacle 204. The RCD 244 can then send a message to the remote device 252 to alert a user that a collection had been made, and the cost of the collection will be billed to the user's account.

In addition, the RCD 244 can change the circuitry between the solar panel 234 and the battery 236, so that solar strength can be measured and an optimal charging configuration can be selected. The charging circuitry 214A-B is illustrated as two circuitries; however, one of ordinary skill in the art will readily recognize that some examples can include more or less circuitries. Charging circuits 214A-B can be designed to be optimized for low light or bright light, and can be switched by the RCD 244 based on programmable or pre-determined thresholds. Also, while solar information can be readily available (e.g., Farmers' Almanac), solar energy at a particular location can vary widely based on the characteristics of the site. For example, light will be weaker if reflected off a black building, and if the building is tall, blocking refracted light. For this reason, it can be useful to measure solar energy on site, as it can be an accurate determinant of actual energy availability at a particular location. To do this, the battery 236 and solar panel 234 can be decoupled using one or more charging relays 212. In other aspects, a very high load can be placed on the battery 236 to diminish its voltage, so that all available current from the solar panel 234 flows through a measureable point. This can be done, for example, by causing the receptacle 204 to run compaction cycles, or by routing electricity through a resistor, or both.

There are a variety of other methods which can be used to create a load. However, putting a load on the battery 236 can cause permanent damage. Thus, the RCD 244 can also be configured to disconnect the battery 236 from the solar panel 234, instead routing electricity through a resistor 220. This can allow for an accurate measurement of solar intensity at a particular location, without depleting the battery 236, which can help assess the potential for running compactions, communicating, powering illuminated advertisements, and powering other operations. In some examples, the PCB 210 can be reconfigured by the RCD 244 to run continuous compaction cycles for a period of time, measure solar panel charging current, relay the data, and then resume normal operations. Different configurations or combinations of circuits can be used to test solar intensity, battery state or lifecycle, and/or predict solar or battery conditions in the future.

The RCD 244 can also track voltage or light conditions for a period of days, and alter the state of load and charging based on constantly changing input data. For example, the RCD 244 can configure the timer 218 of the PCB 210 to turn on the display 232 for advertising for a number of days in a row, starting at a specific time and ending at another specific time. However, if the battery voltage declines over this period of time, the RCD 244 can then reduce the time of the load (the display 232) to every other day, and/or may shorten the time period of the load each day. Further, the RCD 244 can collect information on usage and weather patterns and reconfigure the PCB's 210 normal operating regimen to increase or reduce the load (for example, the advertisement on the display 232) placed on the battery 236, based on the information collected. For example, if it is a Saturday, and expected to be a busy shopping day, the RCD 244 can allow a declining state of the battery 236, and can schedule a period on the near future where a smaller load will be placed on the battery 236, by, for example, not running the advertisement on the coming Monday. In doing so, the RCD 244 can optimize the advertising value and energy availability to use energy when it is most valuable, and recharge (use less energy) when it is less valuable. In order to maximize solar energy gained from a variety of locations, the RCD 244 can cause the PCB 210 to select between one of several charging circuits. For example, if it is anticipated that cloudy conditions are imminent, the RCD 244 can change the circuit that is used for battery charging, in order to make the charger more sensitive to lower light conditions. In a sunny environment, the charger circuit used can be one with poor low-light sensitivity, which would yield more wattage in direct sunlight.

The architecture 200 can also be used for monitoring functions, which can enable users to access information about the receptacle 204 and collection process. With this information, users can make judgments that facilitate their decision-making, helping them remotely adjust settings on the receptacle 204 to improve performance and communication. For example, the RCD 244 can be configured to enable users to easily adjust callback time, which is the normal time interval for communication that is configured in the PCB 210. The RCD 244 can enable the user to alter this time setting, so that the receptacle 204 communicates at shorter or longer intervals. Once the PCB 210 initiates communication, other parameters can be reconfigured, such as awake time, which is the amount of time the receiver is in receiving mode. This enables users to make "on the fly" changes. In some cases, the PCB 210 can shut down after sending a message and listening for messages to be received. In these cases, it can be difficult to send instructions, wait for a response, send more instructions and wait for response, because the time lapse between normal communications can be a full day. However, by remotely adjusting the setting through the RCD 244, the user can make continuous adjustments while testing out the downloaded parameters in real time, and/or close to real time. This can enhance the ability of the user to remotely control the receptacle 204.

Further, the RCD 244 can alter the current of the photoeyes 222B-C, in a test to determine whether there is dirt or grime covering the lens. Here, the RCD 244 can reconfigure the normal operating current of the photoeyes 222B-C. If the lens is dirty, the signal emitter photoeye will send and the signal receiver will receive a signal on high power, but not on low power. In this way, a service call can be avoided or delayed by changing the normal operating current to the photoeyes 222B-C. This can be a useful diagnostic tool.

In some examples, regular maintenance intervals can be scheduled, but can also be altered via information from the RCD 244. The RCD 244 can be configured to run a cycle while testing motor current. If motor current deviates from a normal range (i.e., 2 amps or so), then a maintenance technician can be scheduled earlier than normal. The RCD 244 can send a message to the user by posting an alert on the users web page associated with the receptacle 204.

Other settings can be embodied in the receptacle 204 as well. For example, the PCB 210 can sense that the receptacle 204 is full. The RCD 244 can then configure the PCB 210 to have a web page, or another display, present a full signal. The RCD 244 can alter when the full signal should be presented to the user. For example, after accessing a database with historical collection intervals, the RCD 244 can reconfigure the PCB 210 to wait for a period of time, e.g., one hour, before displaying a full signal at the web page. This can be helpful because, in some cases, a "false positive" full signal can be signaled by the PCB 210, but this can be avoided based on historical information that indicates that a collection only a few minutes after the last collection would be highly aberrational. The RCD 244 can thus be configured to override data from the PCB 210. Instead of sending a full signal to the user, the RCD 244 reconfigures the PCB 210 to ignore the full signal temporarily, and delay the display of a full-signal on the users' web page or smart phone, in order for time to go by and additional information to be gathered about the receptacle's actual fullness status. For example, when a collection is made and ten minutes later, the fullness sensor detects the receptacle 204 is full, the fullness display message on the web page can be prevented from displaying a full status. In some cases, the bag can be full of air, causing the proximity sensor in the receptacle 204 to detect a full bin. Within a certain time period, e.g., twenty minutes in a busy location, a few hours in a less busy location, as determined based on the historical waste generation rate at the site, the bag can lose its air, and the proximity sensor can sense that the bin is less full than it was twenty minutes prior, which would not be the case if the bin was full with trash instead of air. Thus, "false positive" information can be filtered out.

Likewise, tests and checks can be performed so that false negative information is avoided as well. For example, if a bin regularly fills up daily, and there is no message that it is full after two or three days, an alert can appear on the users' web page indicating an aberration. Thresholds for normal operating parameters and adjustments to normal can be set or reset using the RCD 244, or they can be programmed to evolve through pattern recognition. Although many operating parameter adjustments can be made through the web portal, adjustments can also be made automatically. This can be controlled by a software program that aggregates data and uses patterns in an aggregate of enclosures to alter PCB 210 settings on a single enclosure. For example, if the collection data from 1,000 enclosures indicates that collection personnel collect from bins too early 50% of the time when compaction threshold setting is set to "high", compared to 10% of the time when compaction settings are set at "medium," then the RCD 244 can reprogram the compaction thresholds to the medium setting automatically, so that collection personnel can be managed better, limiting the amount of enclosures that are collected prematurely. Automatic reprogramming, governed by software programs, can be applied to other aspects, such as user response to dynamic elements of the receptacle 204, such as lighted or interactive advertising media displayed on the receptacle 204. For example, if users respond to an LCD-displayed advertisement shown on the receptacle 204 for "discounted local coffee" 80% of the time, the RCD 244 can configure all receptacles within a certain distance, from participating coffee shops, to display the message: "discounted local coffee."

In some examples, the RCD 244 can include a data receiving portal for the user with information displays about an aggregate of receptacles. Here, the user can access real-time and historical information of, for example, receptacles on a route, and/or receptacles in a given geography. The data can be displayed for the user on a password-protected web page associated with the aggregate of receptacles within a user group. The receptacle 204 can also display, for example, bin fullness, collections made, the time of collections, battery voltage, motor current, number and time of compaction cycles run, graphs and charts, lists and maps, etc. This data can be viewed in different segments of time and geography in order to assess receptacle and/or fleet status, usage, and/or trends. The users' web page can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular receptacle is displayed after the user clicks on a dot displayed on a map which represents that receptacle. This can allow the user to easily view and interact with a visual map in an external application.

The RCD 244 can be configured to display calculated data, such as "collection efficiency," which is a comparison of collections made to collections required, as measured by the utilized capacity of the receptacle 204 divided by the total capacity of the receptacle 204 (Collection Efficiency=utilized capacity/total capacity). The user can use this information to increase or decrease collections, increase or decrease the aggregate capacity across an area, etc. Typically, the users' goal is to collect the receptacle 204 when it is full—not before or after. The user can click buttons on their web page to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the web page can display a labor cost statistic automatically using information generated from the vehicle usage monitor. As the user clicks on buttons or otherwise makes commands in their web portal, the RCD 244 can change the PCB's 210 operating parameters, usage of sensors, etc., and/or measurement thresholds in response. The RCD 244 can also be configured to automatically display suggested alterations to the fleet, such as suggestions to move receptacles to a new position, to increase or decrease the quantity of receptacles in a given area, to recommend a new size receptacle based on its programmed thresholds, resulting in an improvement in costs to service the fleet of receptacles.

Heat mapping can also be used to provide a graphical representation of data for a user. Heat mapping can show the user the level of capacity in each part of an area, for example a city block, or it can be used to show collection frequency in an area. In each case, the heat map can be generated by associating different colors with different values of data in a cross sectional, comparative data set, including data from a plurality of enclosures. The heat map can be a graphical representation of comparative data sets. In some examples, red can be associated with a high number of a given characteristic, and "cooler" colors, like orange, yellow and blue, can be used to depict areas with less of a given characteristic. For example, a heat map showing collection frequency or compaction frequency across 500 receptacles can be useful to determine areas where capacity is lacking in the aggregate of enclosures—a relative measure of capacity. In this case, the highest frequency receptacle can assigned a value of red. Each number can be assigned progressively cooler colors. In other examples, the red value can be associated with a deviation from the average or median, for example, a darker red for each standard deviation. The heat maps can be shown as a visual aid on the user's web page, and can color-code regions where "bottlenecks" restrict vehicle and labor efficiency. A small red region can show graphically, for example, that if the user were to replace only ten receptacles with higher-capacity compactors, the collection frequency to a larger area could be reduced, saving travel time. Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which receptacles are of low power, etc. While specific measurements are described herein to demonstrate the usefulness of heat mapping, there are other sets of data that can be represented by the heat maps, which are within the scope and spirit of this invention.

The heat map can also be used to present a population density in one or more areas, as well as a representation of any other activity or characteristic of the area, such as current traffic or congestion, for example. This information can also be shared with other businesses or devices. For example, the RCD 244 can analyze the heat map and share population statistics or activity with nearby businesses or municipalities. The RCD 244 can, for example, determine a high population density in Area A on Saturday mornings and transmit that information to a nearby locale to help the nearby locale prepare for the additional activity. As another example, if the receptacle is placed in a park, the RCD 244 can determine population and activity levels at specific times and alert park officials of the expected high levels of activity so the park officials and/or those managing the receptacle can plan accordingly.

The RCD 244 can also be used for dynamic vehicle routing and compaction and/or receptacle management. Because the RCD 244 can be a two-way communicator, it can both send and receive information between various receptacles and databases. This can allow the user to cross-correlate data between the fleet of receptacles and the fleet of collection vehicles. The RCD 244 can receive data from the user and/or the user's vehicle. For example, the RCD 244 can receive GPS data or availability data, and use it to change parameters on a given receptacle or aggregate of receptacles. The RCD 244 can receive this data from the users' GPS-enabled smartphone, for example. Similarly, the RCD 244 can send data to the user, a user device, a smartphone, etc., about the status of the receptacle 204. With this two-way data stream, collection optimization can be calculated in real time or close to real time. For example, a collection truck is traveling to the east side of a city and has 30 minutes of spare time. The RCD 244 can receive information about the truck's whereabouts, availability and direction, and query a database for receptacle real time and historical fullness information and determine that the truck can accommodate collections of twenty receptacle locations. The RCD 244 can then display a list of twenty receptacle locations that the truck can accommodate. The user can view a map of the twenty recommended locations, see a list of driving directions, etc. The map of driving directions can be optimized by adding other input data, such as traffic lights, traffic conditions, average speed along each route, etc. At the same time, as the truck heads to the east side of the city, the RCD 244 can reconfigure receptacles on the west side to change compaction thresholds, so that capacity is temporarily increased, freeing up additional time for the truck to spend in the east section. Alternatively, the RCD 244 can reconfigure a receptacle to temporarily display a "full" message to pedestrians, helping them find a nearby receptacle with capacity remaining. The RCD 244 can, in the case where the receptacle requires payment, increase pricing to the almost-full receptacle, reducing demand by pedestrians or other users. This same logic can be effective in situations where trucks are not used, for example, indoors at a mall or airport. The demand for waste capacity can vary, so having remote control over the receptacle 204 can allow users to change settings, parameters, and/or prices to make the collection of waste dynamic and efficient.

The location of the receptacle 204 and other receptacles can be determined via triangulation and/or GPS, for example, and placed on a map in the interactive mapping features. Moreover, the location of an indoor receptacle can be obtained from indoor WiFi hot spots, and the indoor receptacle can be placed on a map in the interactive mapping features. As a staff member accomplishes tasks (i.e., cleaning a bathroom) and moves inside a facility, the staff member's location can be tracked, and the fullness and location of nearby receptacles can be plotted on a map or given to the staff member by other means, as instructions to add a collection activity to the list of tasks. Whether by GPS, Wifi, Bluetooth, etc., triangulation between communication nodes can serve to locate a receptacle on a map, and measurements of fullness of receptacles can be used to create work instructions for staff members or truck drivers, so that efficient routes and schedules can be created to save time.

To better manage the collection process, user groups can be separated between trash and recycling personnel. In many cities, there are separate trucks used to collect separate streams of waste, such as trash and recyclables. For this reason, it can be helpful to configure the user's web page to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular receptacle in the system, view collection efficiency of a particular waste collector, view login history, and/or view industry or subgroup benchmarks, while a waste collector with lower privileges can only view receptacle fullness, for example. The RCD 244 or another device can also be configured to print a list of receptacles to collect next, a list of full or partially full bins, etc. For example, the remote device 252 can be configured to print a list of receptacles to collect in the remaining portion of a route.

Figure 3:
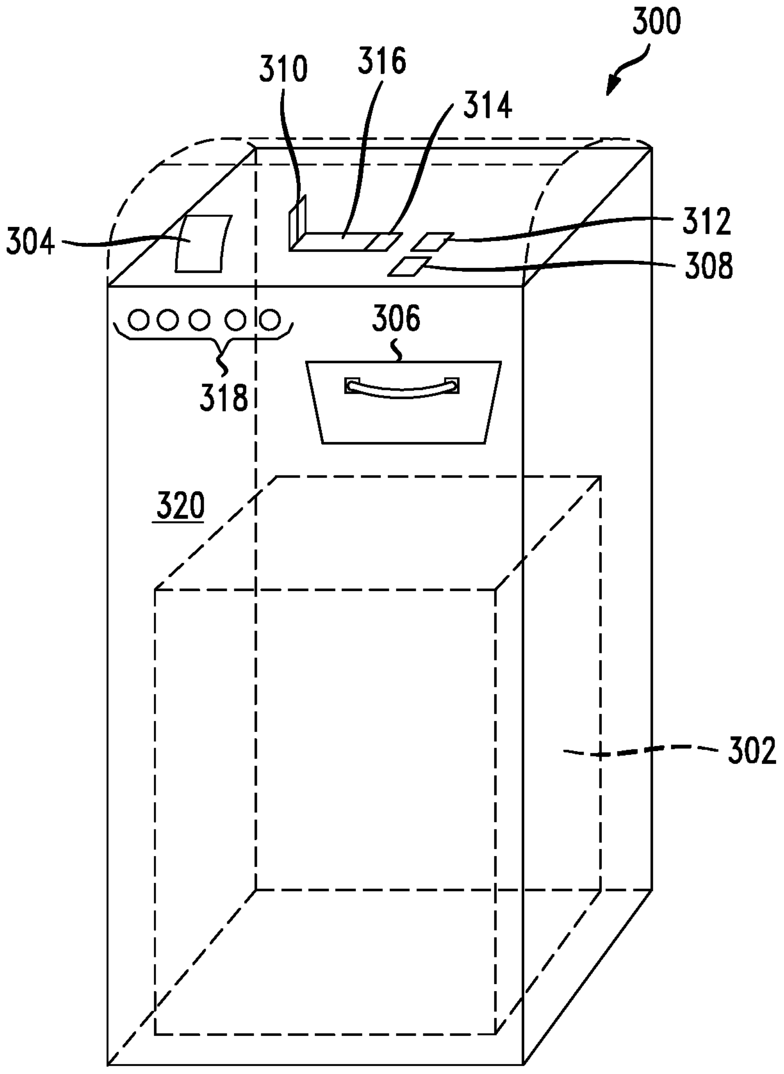
FIG. 3 illustrates an example storage receptacle.

FIG. 3 illustrates an example storage receptacle 300. The storage receptacle 300 has a side wall 320 and includes a bin 302 for storing content items, and a door 306 for opening the storage receptacle 300 to throw items in the bin 302. The storage receptacle 300 can have one or more sensors 304A-B, such as photoeye sensors, placed above the bin 302 for detecting the fullness state of the bin 302. The storage receptacle 300 can also include a sonar sensor 308 to detect objects in the receptacle 300 and calculate the fullness state of the receptacle 300. As one of ordinary skill in the art will readily recognize, the sonar sensor 308 and sensors 304A-B can also be placed in other locations based on the size and/or capacity of the receptacle 300, storage requirements, storage conditions, etc. The storage receptacle 300 can also include other types of sensors, such as an infrared sensor, a temperature sensor, a hall effect sensor, an encoder sensor, a motion sensor, a proximity sensor, etc. The sonar sensor 308 and sensors 304A-B can sense fullness at regular intervals, and/or based on manual inputs and/or a pre-programmed schedule, for example. Moreover, the sonar sensor 308 and sensors 304A-B are electrically connected to the printed circuit board (PCB) 316. Further, the sonar sensor 308 and sensors 304A-B can be actuated by the PCB 316, which can be configured to control the various operations of the storage receptacle 300.

The PCB 316 can control electrical functions performed by the storage receptacle 300. The electrical functions controlled by the PCB 316 can include, for example, running compactions by actuating a motor; sensing waste or recyclables volume inside the receptacle 300 using a sensor at regular or programmable intervals, such as sensors 304A-B; changing status lamps 318 at regular and/or programmable thresholds to/from a color indicating that the receptacle 300 is not full (e.g., green), to/from a color indicating that the receptacle 300 is almost full (e.g., yellow), to/from a color indicating that the receptacle 300 is full (e.g., red); collecting data and transmitting the data to another device; receiving data from another device; managing a power mode; measuring and managing a current; performing diagnostics tests; managing a power source; etc. The motor controller 310 can enable voltage to be applied across a load in either direction. The PCB 316 can use the motor controller 310 to enable a DC motor in the receptacle 300 to run forwards and backwards, to speed or slow, to "brake" the motor, etc.

The storage receptacle 300 includes a transmitter 312 and a receiver 314 for sending and receiving data to and from other devices, such as a server or a remote control device. Accordingly, the storage receptacle 300 can transmit and receive information such as instructions, commands, statistics, alerts, notifications, files, software, data, and so forth. The transmitter 312 and receiver 314 can be electrically connected to the PCB 316. This way, the transmitter 312 can transmit data from the PCB 316 to other devices, and the receiver 314 can receive data from other devices and pass the data for use by the PCB 316. In this regard, a user who is checking the status of the receptacle could drive down the street near the device (say within a wireless range, such as Bluetooth or WIFI, for example), not even get out of their vehicle, but receive a signal indicating that all is well, that the trash needs to be emptied, or that a repair or cleaning is needed.

Status lamps 318 can provide an indication of the status of the storage receptacle 300. For example, the status lamps 318 can indicate the fullness state of the storage receptacle 300. To this end, the status lamps 318 can be configured to display a respective color or pattern when the storage receptacle 300 is full, almost full, not full, etc. For example, the status lamps 318 can be configured to flash red when the storage receptacle 300 is full, yellow when the storage receptacle 300 is almost full, and green when the storage receptacle 300 is not full. Moreover, the status lamps 318 can be LED lights, for example.

The status lamps 318 can also be configured to flash in various patterns to indicate various other conditions. For example, the status lamps 318 can be configured to flash at the same time and in combination to show that the receptacle 300 is full. The status lamps 318 can also be configured to flash in different patterns or times or colors to show troubleshooting status information for example. In some cases, the status lamps 318 can be configured to flash in a predetermined manner to show that a door of the receptacle is open, a component is damaged, an obstacle is stuck, an operation is currently active, etc.

As one of ordinary skill in the art will readily recognize, the receptacle 300 can include other components, such as motors, sensors, batteries, solar panels, displays, relays, chargers, GPS devices, timers, fuses, resistors, remote control devices, cameras, etc. However, for the sake of clarity, the receptacle 300 is illustrated without some of these components.

Figure 4:
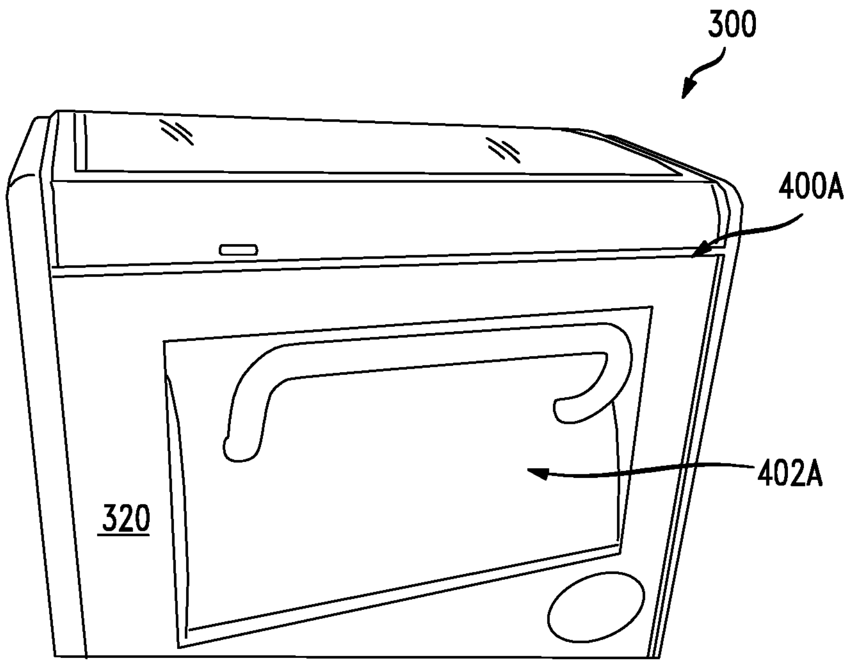
FIG. 4 illustrates a front view of an example receptacle.

Referring now to FIG. 4, receptacle 400 illustrates a storage receptacle, such as receptacle 300 in FIG. 3. The door 402 is shown in which a user can open the door and put in trash. A hinge can be positioned along a right side edge of the door 402 and enable the door 402 to be opened exposing the interior of the receptacle. The door 402 can serve as an insertion point to allow users to dispose materials for storage in the bin on the receptacle 400.

Figure 5:
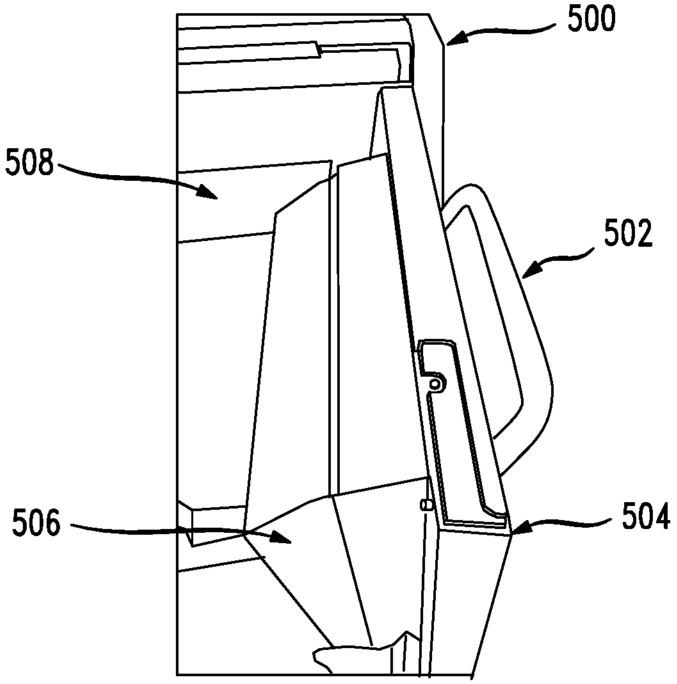
FIG. 5 illustrates open view of an exemplary storage receptacle.

Referring now to FIG. 5, receptacle 500 can include a door 504 which can be accessible to nearby users and serve as an insertion point for users to insert materials into the receptacle 500. In some cases, the door 504 can be a hopper door, for example. The door 504 can be pushed or pulled by a user to provide an opening that allows a user to place items inside the receptacle 500. In some aspects, the door 502 can swing backwards when pushed by a user in order to create an opening into the receptacle 500 for storing or disposing materials into the receptacle 500. Moreover, the door 504 can include a handle to allow users to manually open the door 504. In some cases, the door 504 and/or handle 502 can be fitted with a hands free interface, as described in FIGS. 6-11, for opening the door 504 with a foot pedal.

The receptacle 500 can also include an access door 506 which can be opened from outside of the receptacle 500 to access the inside 508 of the receptacle 500. When opened, the access door 506 also provides access to the door 504.

Hands Free Structure for a Storage Receptacle

Figure 6A:
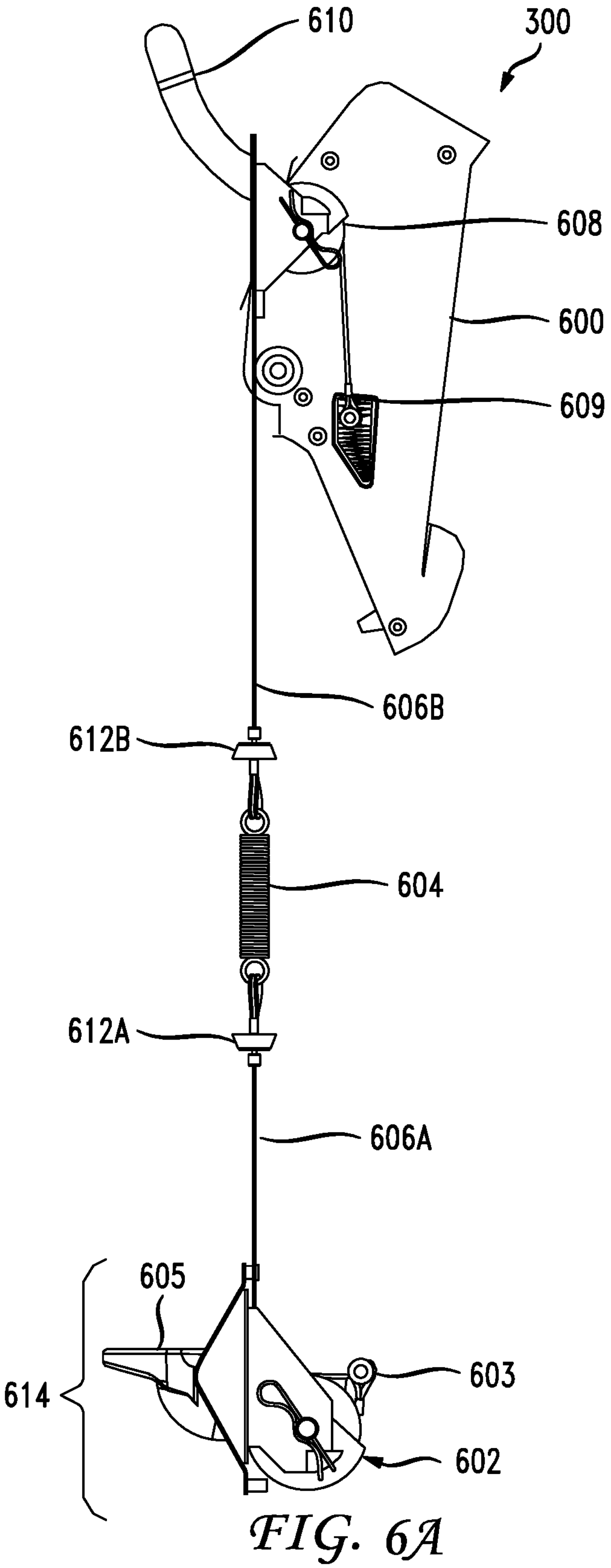
FIGS. 6A and 6B illustrate a hands free interface for a door or hopper of a storage receptacle.
Figure 6B:
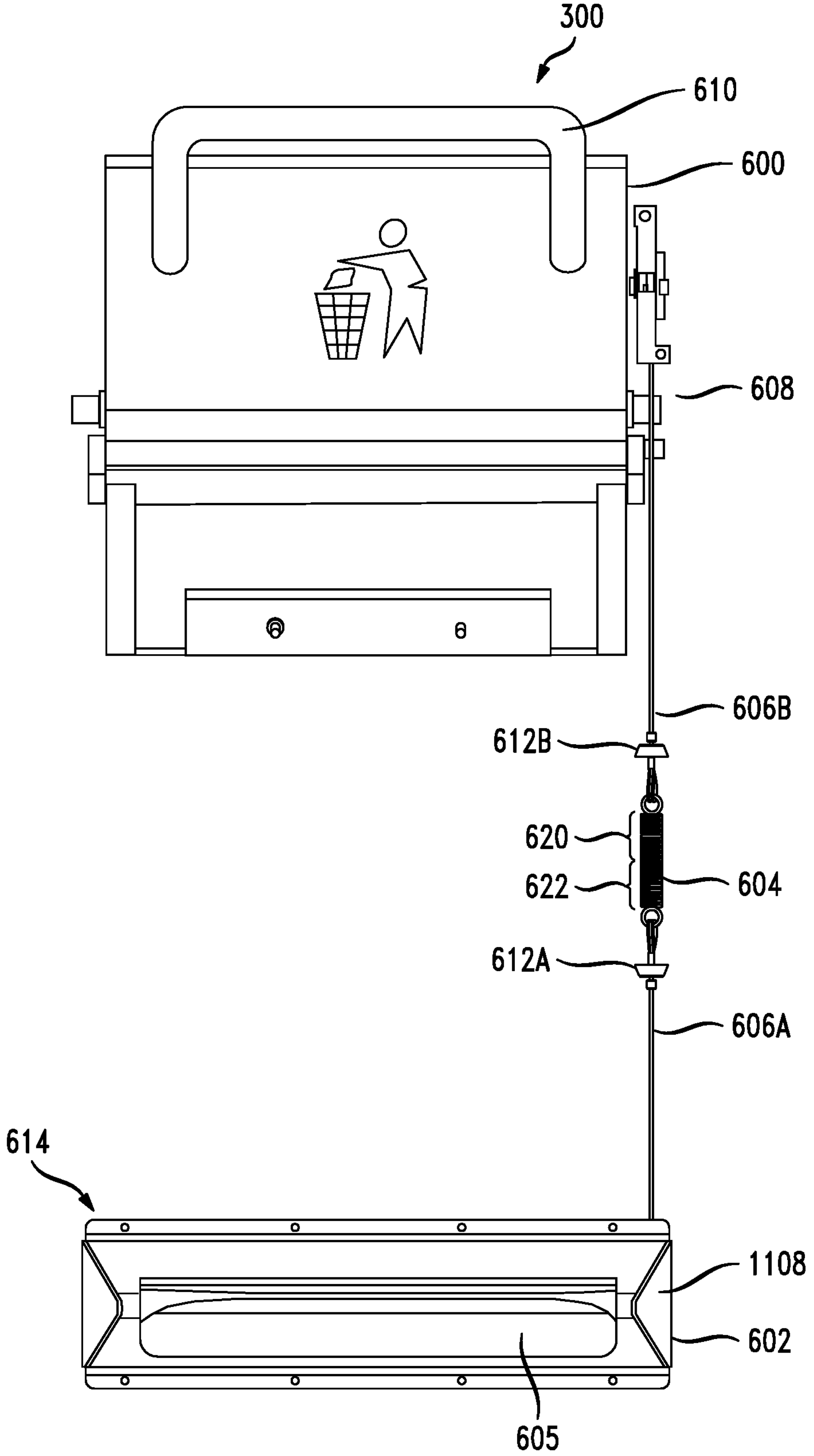

This disclosure next discusses the hands free structure that enables a user to open a hopper of a storage receptacle through stepping on a foot pedal. FIGS. 6A-B illustrate a hands free interface for a door 600. In particular, FIG. 6A illustrates a side view, and FIG. 6B illustrates a front view.

The door 600 can be used for providing access to a compactor or receptacle such as 300, 400, and 500 illustrated in FIGS. 3, 4, and 5 respectively. In some cases, the door 600 can be a hopper door. Moreover, the door 600 can include a handle 610. The handle 610 and door 600 can be connected to a cables 606A-B used for opening and closing the door 600. The cables 606A-B can be a steel cable, a rubber cable, or any other type of cable. The cables 606A-B can be connected to a pedal structure 614. The pedal structure 614 can be mounted to the receptacle on the side wall 320. The pedal structure 614 can include a pulley 602 to translate upward pull of the cables 606A-B to downward pull in order to open the door 600, and a foot pedal 605.

The pedal structure 614 includes a foot pedal 605 that can rotate downward when pressure is applied. By rotating downward, the pedal 605 can be difficult to fully stand on. For example, of user tried to damage the pedal structure 614 by standing on the pedal, the pedal would rotate down and make it difficult to damage the system, including the door 600 and mechanism. In some cases, the pedal 605 can have a curved underside which prevents catching and sticking on snow or other debris that may collect under the pedal 605. The pedal 605 can have a curved profile to deflect impact from snow removal equipment or similar machinery operating on sidewalk spaces. When the pedal 605 rotates, it can pull on the cables 606A-B.

The cables 606A-B can include a second cable 606B and a first cable 606A. The top cable portion 606A and bottom cable portion 606B can be different and/or separate cables, for example. The cables 606A-B can include a spring 604. The spring 604 can be a connection point between the second cable 606B and first cable 606A. The spring 604 can divide and interconnect the second cable 606B and the first cable 606A. For example, the spring 604 can attach, couple, connect, lock, and/or secure to the first cable 606A on one end and the second cable 606B on another end. Further, the spring 604 can be coupled inline with the first cable 606A and the second cable 606B. The spring, first cable 606A, and second cable 606B can work together or act in concert with the pedal 605 to open the door 600 based on, for example, force applied to the pedal 605.

When a normal or expected amount of force is applied to the pedal 605, the spring 604 can be pre-loaded to operate as a rigid body, transferring the motion of the bottom cable directly to the top cable. When excessive force is applied to the second cable 606B and/or first cable 606A, the spring 604 can extend, relieving the force and limiting the force seen on the system.

Spring Structure

Figure 9A:
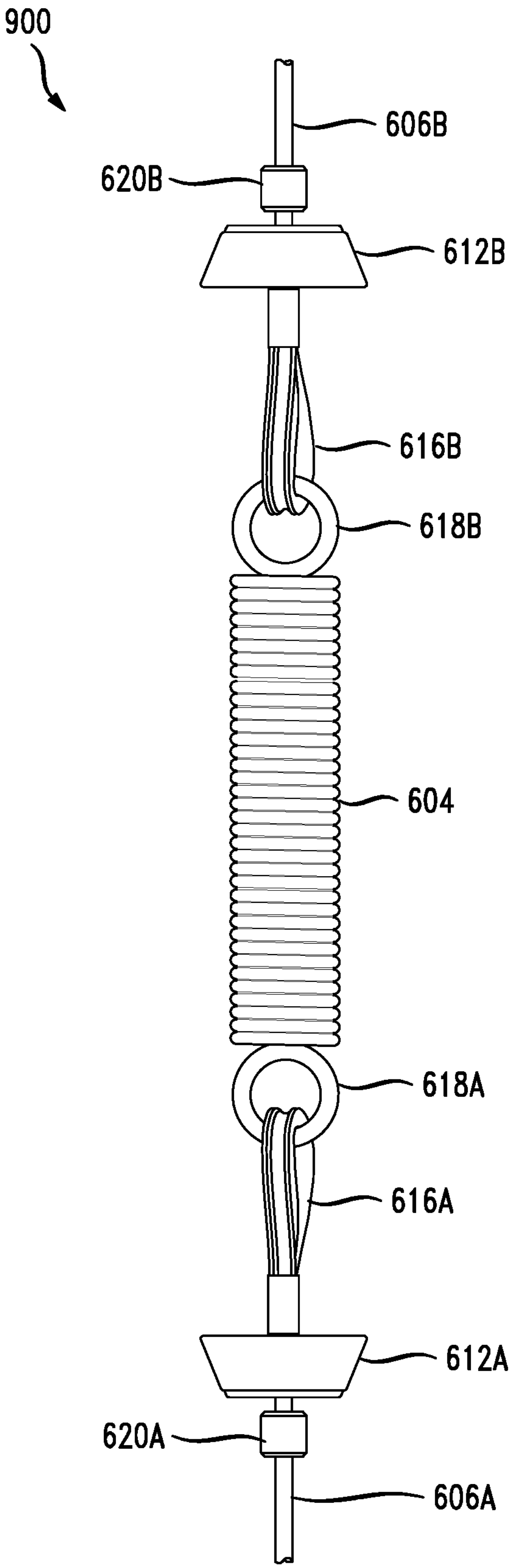
FIGS. 9A-9F illustrates a spring, cable and various bumpers for the pulley and cable system.

The purpose of the spring is to prevent the hopper 600 from slamming open and injuring a child or a person in front of the receptacle. The spring can have different structure characteristics in order to perform the function. For example, the spring may be a standard spring or it may be tailored with different portions of the spring having different characteristics. FIG. 9A illustrates this point. In one aspect, the spring has one portion 620 having a winding size or distance between windings (i.e., rather than the windings being right next to each other in an un-extended or resting position, the windings are separated.) The diameter of a first portion of a metal winding in the spring might be different than the diameter of a second portion 622 of the spring. The materials and/or shape of the wire may be different as well. By including a spring structure with varying characteristics in at least two portions of the spring, the desired result of how and when the hopper 600 opens when the pedal is stepped on hard can be controlled.

A specific example can help make the point. If the spring has a lower portion 622 with windings that are more flexible and an upper portion 620 with stiffer windings that are less flexible, if a person steps hard on the pedal, the lower portion of the spring can initially expend/extend and absorb some of the energy. Then when the pull is strong enough the upper less flexible portion of the spring can begin to extend and the hopper can start to open.

A discussion focused on the spring 604 used for opening the door 600 follows. A storage receptacle 300 can include a pedal 605 mounted to the storage receptacle 300. The pedal 605 can be configured to rotate downward when force is applied resulting in a downward force on a first cable 606A via interaction with a first pulley 602. Spring 604 can be coupled with the first cable 606A, wherein a bottom end of the spring 604 is coupled with a top end of the first cable 606A. A second cable 606B can be attached to a top end of the spring 604. The second cable 606B can be coupled with a second pulley 608 and a door 600 configured to open in response to the pedal 605 rotating downward when the force is applied on the pedal 605. The second cable 606B can be coupled with the door 600 via coupling element 609. The spring 604 can be configured to retract as the door 600 opens until the door 600 is opened to a predetermined full range configured for the door 600. The spring 604, the first cable 606A, and the second cable 606B can be configured such that as the door 600 opens, the force necessary to keep opening the door 600 or maintain the door 600 open decreases.

In another example, as the pedal 605 rotates downward, the spring 604 extends and stores enough force to start opening the door 600. The spring 604 acquires enough extension and force to start opening the door 600 typically when the pedal 605 rotates downward at least halfway relative to a predetermined full range of downward motion configured for the pedal 605. As the door 600 begins to open, the spring 604 is configured to retract until the door 600 is open. Once the spring 604 has retracted, the pedal 605 is configured to transfer the pedal's motion or force to open the door 600. The spring 604 can be sized according to a predetermined length which, when the spring 604 is extended, results in the spring 604 having enough force to open the door 600. The predetermined length of the spring 604 can result in the spring 604 having enough force to keep the door 600 in an open position when the spring 604 is retracted. In another example, the predetermined length results in the spring 604 maintaining an amount of force that results in a reduced amount of speed at which the door 600 opens in response to the pedal 605 rotating downward when force is applied to the pedal 605.

The spring 604 can be inserted inline with the first cable 606A and the second cable 606B. The spring 604 can be sized according to a predetermined length that results in a pre-tension on the spring 604 which prevents rotation of the pedal 605 in response to the force applied on the pedal 605 from extending the spring 604. The spring 604 also can be sized according to a predetermined length that results in an amount of pre-load on the spring 604. The amount of pre-load results in a pulling force by the spring 604 on the first cable 606A and/or the second cable 606B of at least 5 pounds of force. The amount of pre-load on the spring 604 reduces a downward travel distance of the pedal 605 necessary to start opening the door 600. In some examples, the door 600 can be a hopper door, and the second pulley 608 can be configured to transfer a first pulling force on the second cable 606B to a second pulling force on the hopper door 600. The second pulling force can cause the hopper door 600 to at least partly open. In another aspect, the spring is sized so that during normal operation of the hopper, the pre-tension on the spring is such that the maximum force seen during normal operation does not extend the spring. The spring acts as a rigid body in that case. However, during abnormal operation, where the hopper is constrained from moving, the spring extends out. During maximum extension, the spring can be configured to only allow a load on the components in the system that keeps stress load to levels below what would cause a failure.

In either configuration, the cable length can be adjusted to change the amount of pre-load that exists in the spring, further tuning the performance characteristics of the pedal 605. For example, in one configuration, it takes roughly 15 lbs of force to start the hopper opening. With no pre-load on the spring, the pedal needs to be depressed too far to start the motion of the hopper, resulting the pedal 605 not being responsive enough for use on a city street. By shortening the length of the cable, a pre-load was added to the spring so that it is already pulling with roughly 5 lbs of force. The pre-load results in less pedal travel required to start opening the hopper, resulting in a better user experience.

In some examples, the pedal 605 can include a first end on which the force is applied to rotate the pedal downward and a second end 603 with which the first cable 606A is coupled such that when the first end of the pedal rotates downward, the second end 603 rotates upward, thus pulling the first cable 606A downward via the first pulley 602. In other examples, an apparatus can include a spring 604 coupled with a first cable 606A, where a bottom end 618A of the spring 604 is coupled with a top end 616A of the first cable 606A and the first cable 606A is coupled with a pedal 605 and a first pulley 602. A second cable 606B can be coupled with a top end 618B of the spring 604 via a bottom end 616B of the second cable 606B. The second cable 606B can be coupled with a second pulley 608 and a door 600 configured to open in response to the pedal 605 rotating downward when the force is applied on the pedal 605. The second cable 606B can be coupled with the door 600 via connection 609.

Bumper System

The cables 606A-B can include bumpers 612A-B. For example, first cable 606A can include a bumper 612A which can be placed or inserted at or near a connection point with the spring 604. Similarly, second cable 606B can include a bumper 612B which can be placed or inserted at or near a connection point with the spring 604. The bumpers 612A-B can keep the cables 606A-B and spring 604 from contacting the material, such as metal, of the door 600, or other system components and materials, and may prevent undersirable noise and/or friction during operation of the door 600. In some cases, the bumpers 612A-B can be larger in diameter than the spring 604. This can ensure that the bumpers 612A-B will contact system components or materials prior to the spring 604 and may prevent the spring 604 from hitting or rubbing materials or components of the system. The bumpers 612A-B can also reduce the noise or rattle otherwise generated during operation of the door 600. The bumpers 612A-B can be loosely fitted on the cables 606A-B in order to allow for some flexibility, space, or room for movement.

In some cases, the bumpers 612A-B can be made of, or include, rubber, such as hard rubber; plastic; foam; leather; fabric; or any other material(s) which can provide sound deadening and/or protect the spring 604 from forceful contact with other materials or components. The bumpers 612A-B can be shaped with a taper to minimize dragging as the cables 606A-B is opened or closed. The bumpers 612A-B can be shaped as a rectangular, square, circle, triangle, cylindrical, cubic, pyramidal, tire-shaped, bone-shaped, or any other shape. The two bumpers can be completely different in one or more aspect such as size, shape, materials, position (i.e., distance from the spring or the cable), and so forth. One or more bumpers also could be positioned on the spring itself. Thus, one or more bumpers in the system can be configured on one or more of a top cable, the spring in any position, a bottom cable, or in any other position in the system.

A further description of an example system with features focused on the bumper system follows. A storage receptacle 300 can include a pedal 605 mounted to the storage receptacle 300. The pedal can be configured to rotate downward when force is applied resulting in a downward force on a first cable 606A via interaction with a first pulley 602 and a spring 604 coupled with the first cable 606A. A bottom end 618A of the spring 604 can be coupled with a top end 616A of the first cable 606A. A second cable 606B can be coupled with a top end 618B of the spring 604 via a bottom end 616B of the second cable 606B. The second cable 606B can be coupled with a second pulley 608 and a door 600 configured to open in response to the pedal 605 rotating downward when the force is applied on the pedal 605. The second cable 606B can be coupled with the door 600 via coupling point 609.

A first bumper 612B can be coupled with the second cable 606B at a bottom location on the second cable 606B, where the bottom location is above the spring 604 and a first connection point (618B and 616B) that couples the second cable 606B with the spring 604. A second bumper 612A can be coupled with the first cable 606A at a top location on the first cable 606A, where the top location is below the spring 604 and a second connection point (618A and 616A) that couples the first cable 606A with the spring 604. In one example, the first bumper 612B and the second bumper 612A can be sized to be larger in diameter than the spring 604. Each of the first bumper 612B and the second bumper 612A can have a tapered shape, a round shape, a square shape, a rectangular shape, a triangular shape, an irregular shape, etc. The number of bumpers can be 1, 2, 3, up to say 20 or more bumpers configured in different places in the system.

In one example, the first bumper 612B and the second bumper 612A are made of a hard rubber. Moreover, the system can include a first stop 620B above the first bumper 612B, wherein the first bumper 612B is constrained by the first stop 620B within the bottom location of the second cable 606B. The bottom location can be above the first connection point (618B and 616B) and below the first stop 620B within the second cable 606B. A second stop 620A can be positioned below the second bumper 612A, wherein the second bumper 612A is constrained by the second stop 620A within the top location of the first cable 606A. The top location can be below the second connection point (618A and 616A) and above the second stop 620A within the first cable 606A. A bottom pulley 602 can be coupled with the pedal 605 and configured to translate an upward pull of the first cable 606A to a downward pull of the second cable 606B. The second pulley 608 can be configured to translate a downward pull of the second cable 606B to pulling force on the door 600. The second cable 606B can extend through the first bumper 612B and the first cable 606A can extend through the second bumper 612A. The first bumper 612B and the second bumper 612A can be fitted loosely on the second cable 606B and the first cable 606A, respectively, to allow a movement of the first bumper 612B and the second bumper 612A within the second cable 606B and the first cable 606A.

In another example, the second cable 606B extends through a first opening 912 in a centralized location 914 of the first bumper 612B, and the first cable 606A extends through a second opening 912 in a centralized location 914 of the second bumper 612A. The openings may be decentralized as well or in different positions for the different bumpers.

In another example, a system is disclosed for coupling a first cable 606A and a second cable 606B. The system includes a spring 604 coupled at a first end 618A with the first cable 606A and at a second end 618B with the second cable 606B, and a first bumper 612B coupled with the second cable 606B above the second end 618B of the spring 604. A second bumper 612A can be coupled with the first cable 606A below the first end 618A of the spring 604.

A pulley system 608 can be incorporated above the door or hopper 600. The pulley system 608 can translate the downward pull of the cables 606A-B to an upward pull on the door 600. The door 600 can also include a connection point, which can force its motion to open and close. In some cases, a removable service panel on the inside of the door can be implemented. The panel can allow for access to the mechanism while also providing a shield between the mechanism and the waste compartment inside the door 600.

This configuration can allow for reliable performance of the system in both normal operation conditions as well as other conditions, such as where excessive force is applied, debris has built up, slack is introduced in the system, and so forth.

In some cases, the door 600 can have an automated configuration. This configuration allows for the door 600 to be opened automatically. The automated configuration can include a triggering system. The triggering system can differentiate between a user looking to dispose waste (e.g., standing by to access the receptacle) as opposed to a user or object merely moving close to the device. To this end, the trigger system can include close range proximity sensors, a push button, a camera, a noise sensor, a motion sensor, or any other type of sensor or function for detecting use or triggering an automated opening of the door 600. Since the receptacle can be a solar-powered device, software logic can be employed to minimize energy draw of the trigger mechanism.

The automated configuration can also include a mechanism for physically moving the door 600. The door 600 can open once a command to open the door 600 is registered. The door opening mechanism can include, for example, a linear actuator pulling on a similar cable to the foot pedal, a spool-type device pulling on a similar cable to the foot pedal, a gear system directly rotating pivot point on the door 600, etc.

Figure 6C:
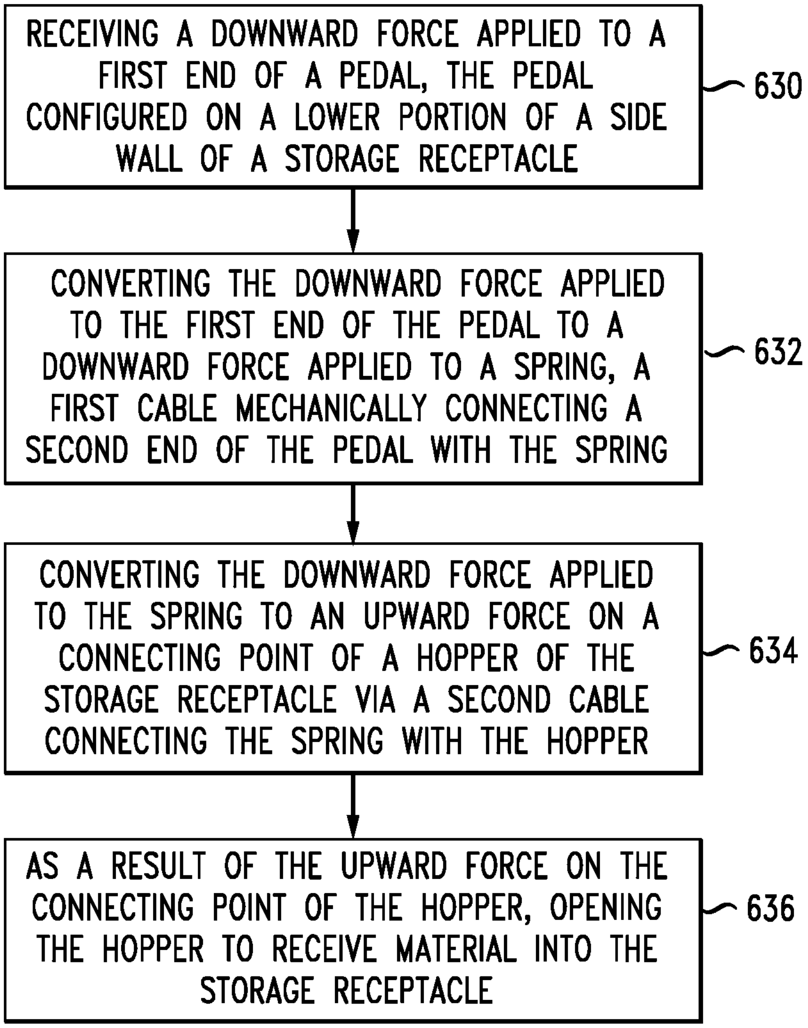
FIG. 6C illustrates a method aspect for operating a hands free receptacle.

FIG. 6C illustrates an example method example for the general storage receptacle. The method includes receiving a downward force applied to a first end of a pedal, the pedal configured on a lower portion of a side wall of a storage receptacle (630) and converting the downward force applied to the first end of the pedal to a downward force applied to a spring, a first cable mechanically connecting a second end of the pedal with the spring (632). The method includes converting the downward force applied to the spring to an upward force on a connecting point of a hopper of the storage receptacle via a second cable connecting the spring with the hopper (634) and, as a result of the upward force on the connecting point of the hopper, opening the hopper to receive material into the storage receptacle (636).

Figure 7A:
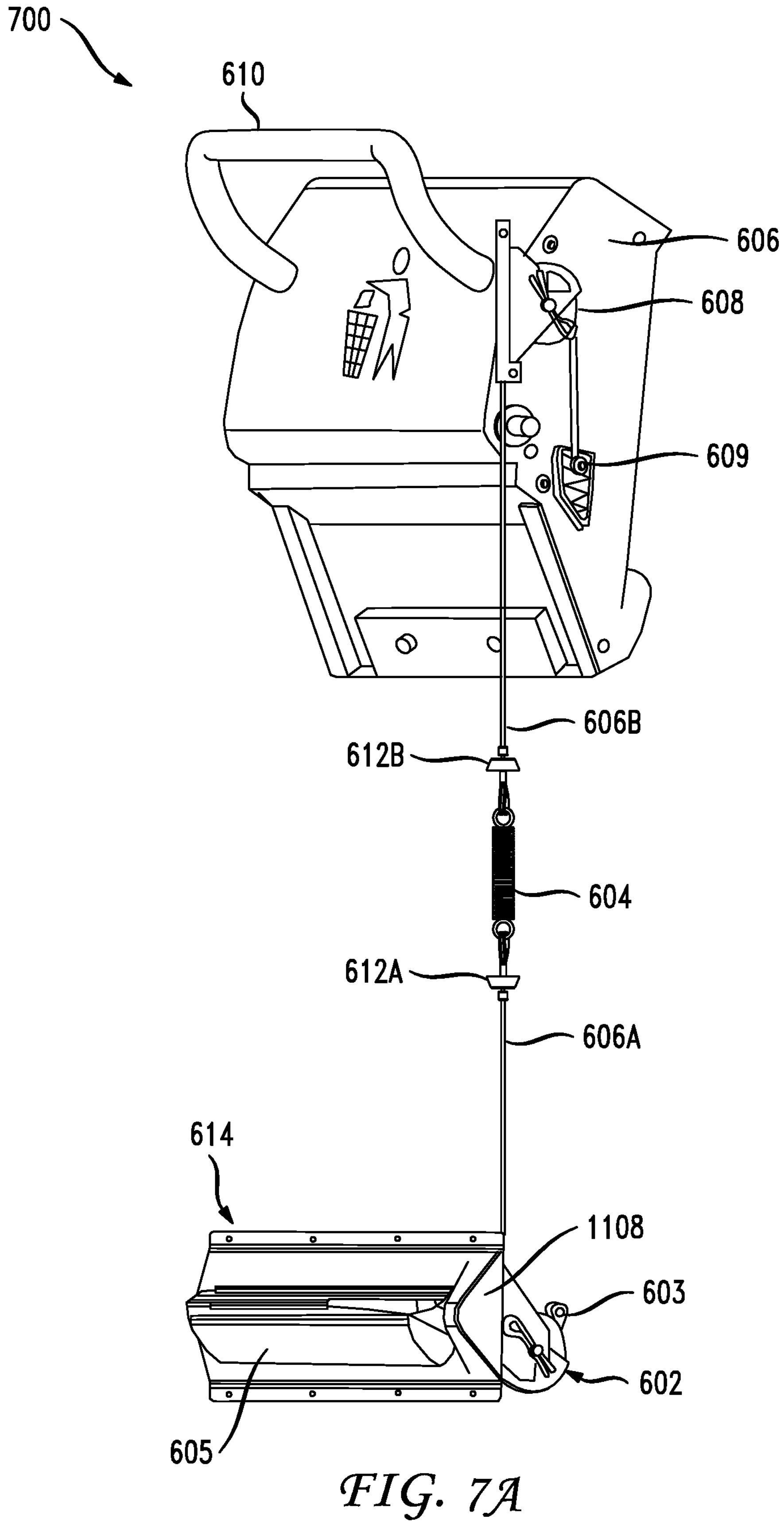
FIGS. 7A and 7B illustrate different views of an example hands free interface for a door of a receptacle.
Figure 7B:
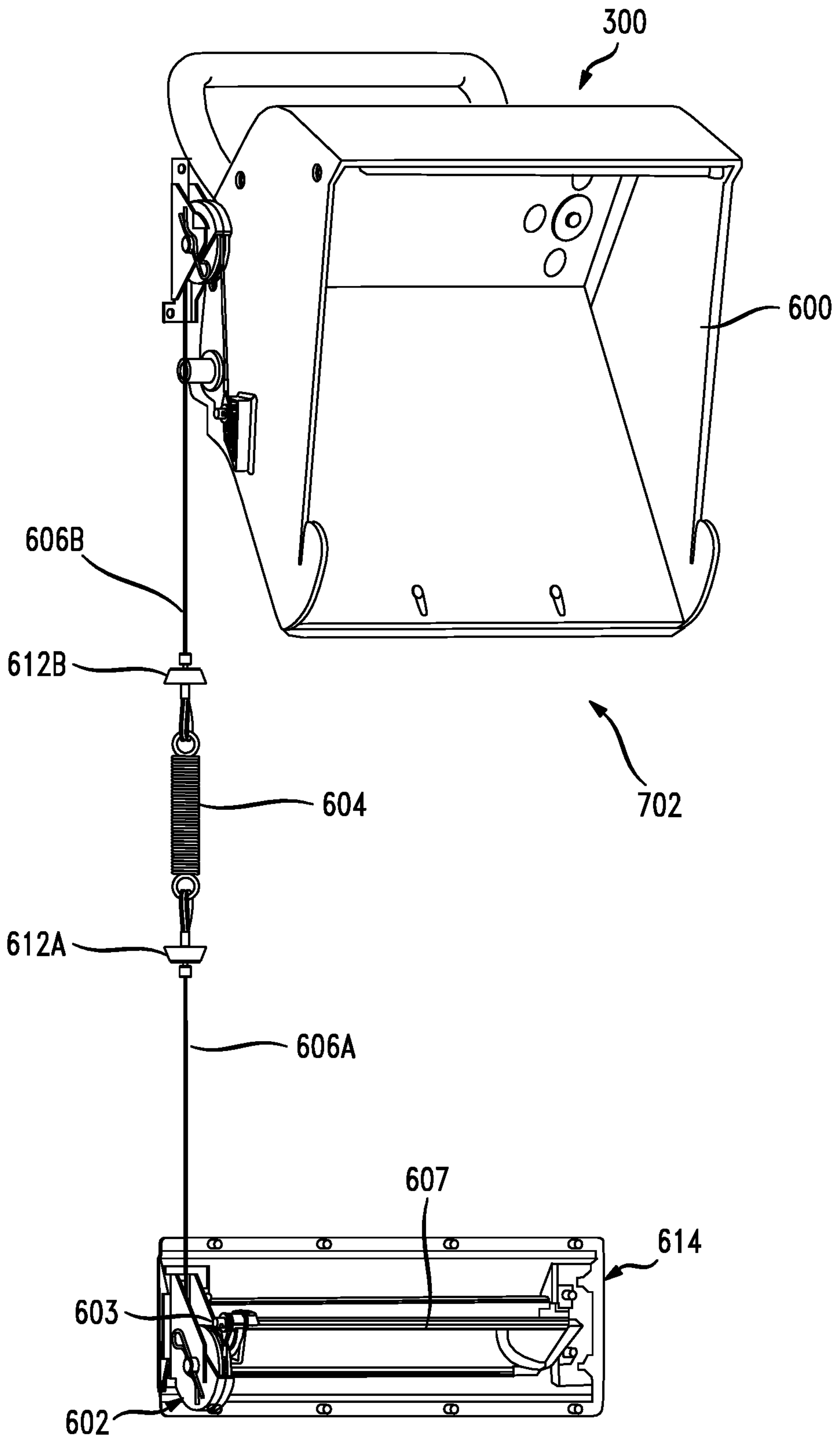

FIG. 7A illustrates a different, frontal view 700 of the hands free interface in a storage receptacle 300 and the various components such as the pedal structure 614, lower pulley 602 and the end of the lower cable 603. The point 603 is generally where the end of the lower cable 606A is connected to an end of the pedal structure. FIG. 7B illustrates a back view 702 of the hand free interface. The back view 702 shows the back of the door or hopper 600 of the receptacle 300 and a second portion 607 of the pedal 605 of FIG. 7A. Note that the pedal 605 has a first end shown in FIG. 7A and a second end 607 in FIG. 7B. The rotational configuration of the pedal 605 allows the cable 606A to be attached 603 via the pulley 602 to the second end 607 of the pedal. Thus, when a user steps on the front portion of the pedal 605, the second portion or second end 607 of the pedal moves upward which pulls the cable attached at point 603 upward and thus, via the pulley 602, the cable 606A downward at the spring 604.

A Shroud System

Figure 8A:
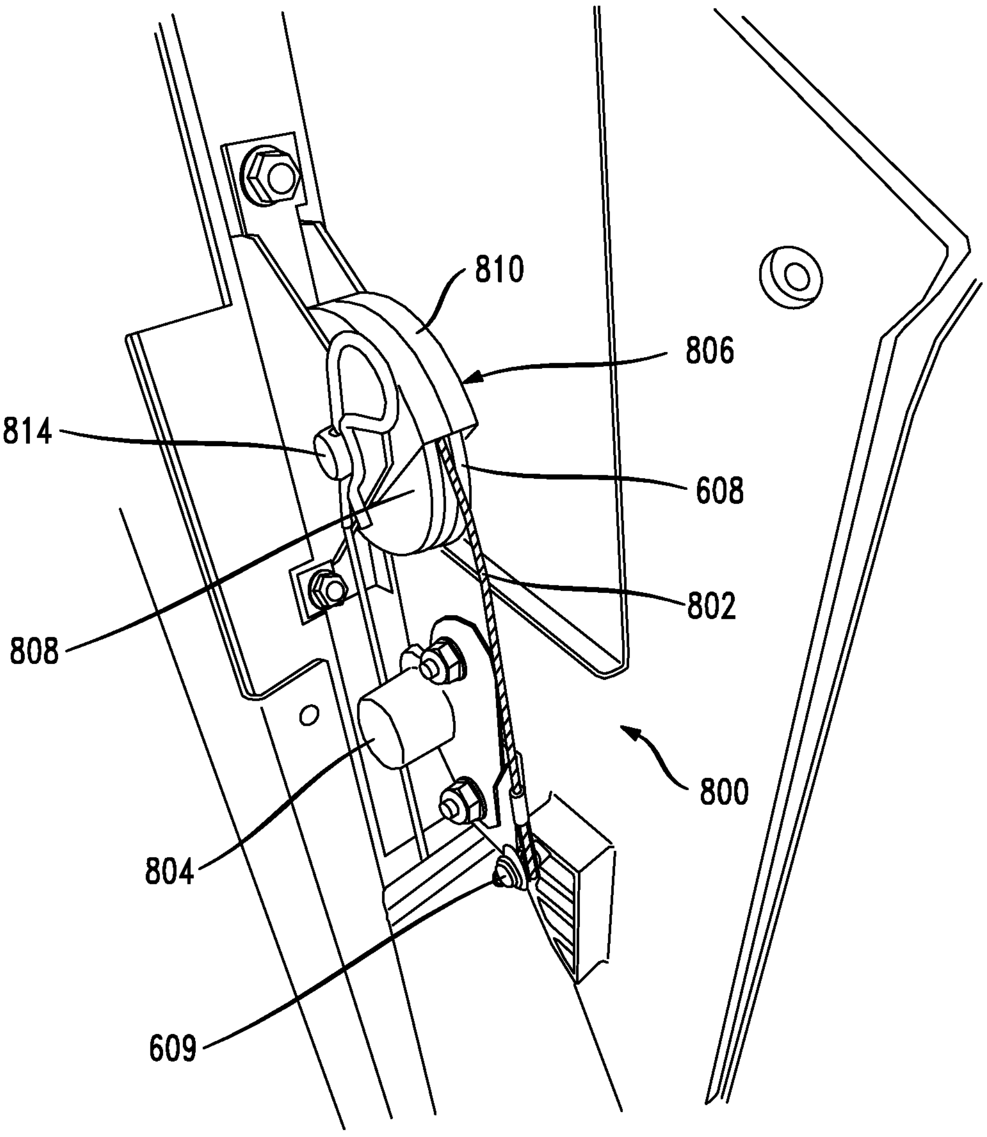
FIGS. 8A-8C illustrate a cover or shroud over an upper pulley system that prevents a cable from slipping off the pulley.
Figure 8B:
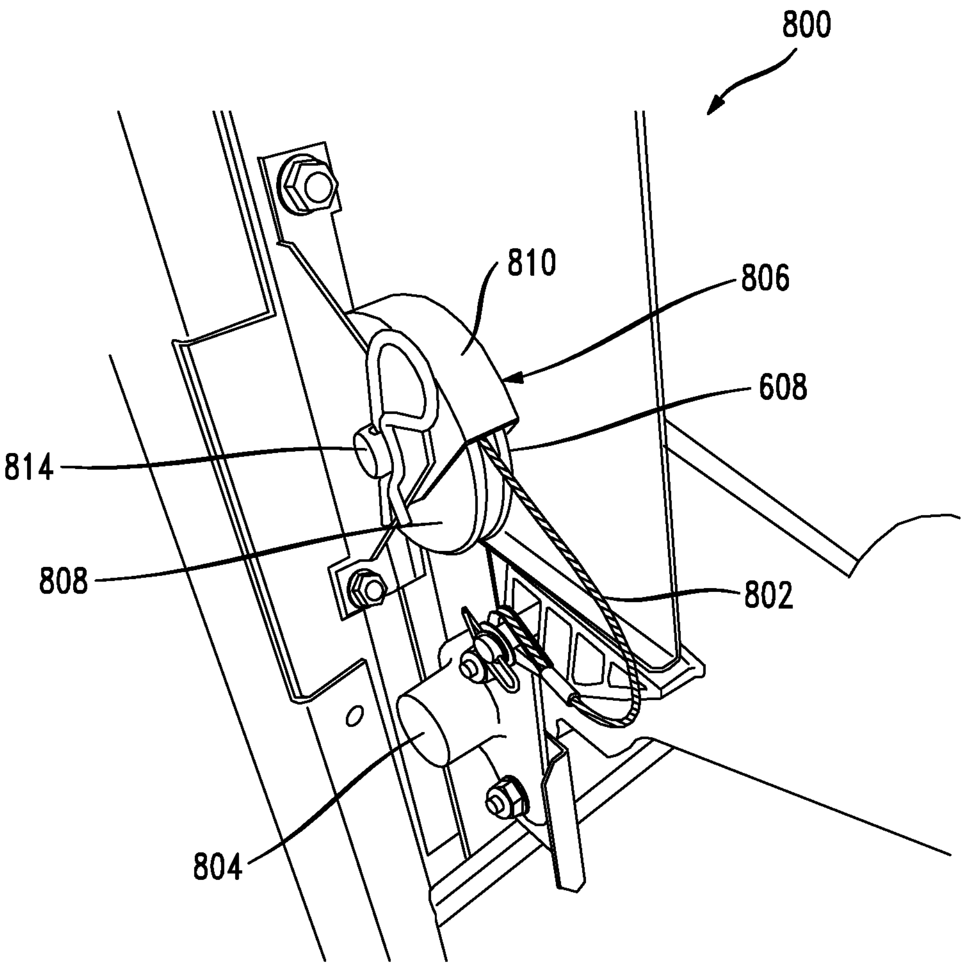

FIG. 8A illustrates a top pulley 608 attached to the door 600. The pulley 608 can include a ring 804, a pulley shroud 800 and cable 802 for opening and closing the door 600. The pulley 608 can also include a pin to lock the pulley shroud and/or the top pulley, as well as an attachment for attaching the cable 802 to the door 600 and/or receptacle. The shroud 800 can cover over the pulley and may prevent the cables 606A-B from becoming dislodged from the proper track in the pulley 608. FIG. 8B illustrates the protection that the shroud 800 provides. FIG. 8B represents the hopper in an open position in which the cable 802 has slack in it and can potentially derail from the pulley 608. Thus, the shroud 800 which covers a top portion of the pulley 608 will prevent the cable 802 from lifting up and off of the pulley 608 or out of the pulley groove when the hopper is in the open position. The shroud can cover various lengths around the pulley 608. For example, FIG. 8A shows the shroud 800 covering more than 50% of the circumference of the pulley 608. The shroud 800 could cover less than 50% or even be configured to be just a bar around the position 806 that prevents the cable from being lifted up out of the track of the pulley 608.

Figure 8C:
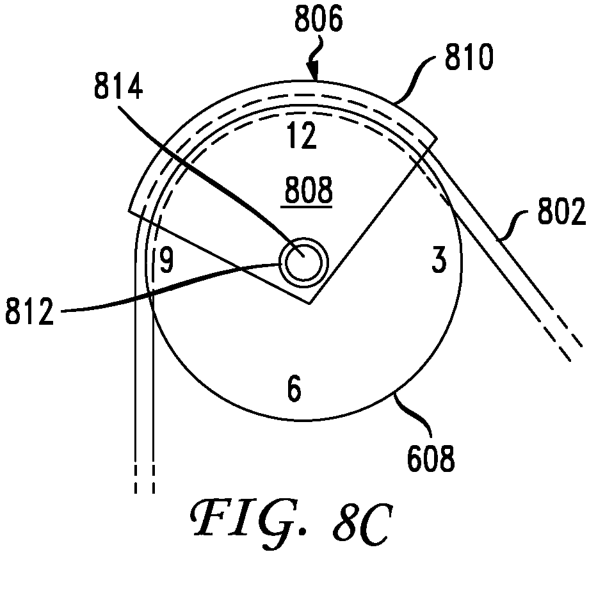

FIG. 8*c* illustrates the shroud 806 positions such that it covers past 9 o'clock and about 1 to 2 o'clock on the pulley 608. The cable 802 is in a groove (not shown) in the pulley 608. Further example structures of the shroud system are as follows. An apparatus includes a side wall of the apparatus, the side wall having, in a lower portion thereof, a foot pedal rotatably configured in the lower portion of the side wall, a cabling system comprising a cable, and a hopper having a connection point and being configured to open and close in an upper portion of the side wall of the storage receptacle, the hopper configured such that when a user presses on the foot pedal, the cabling system causes the cable connected to the connection point on the hopper to pull up resulting in opening the hopper to enable the user to place material in a storage bin in the apparatus.

A pulley can have a groove containing the cable 802. A shroud 806 can cover at least a portion of the pulley 608 such that upon a user manually opening the hopper using a hopper handle and independent of using the foot pedal, thus introducing slack into the cable, the cable stays within the groove. The shroud 806 can at least a position beyond the perimeter of the pulley positioned at approximately between 1 and 3 o'clock. The shroud can include a first side 808, a second side (not shown in FIGS. 8A-8C but on an opposite side) and a top surface 810 connecting the first side 808 and the second side. The first side 808 has a first side pin opening 812 and the second side has a second side pin opening. A pin 814 can be positioned through the first side pin opening 812, an opening in the pulley, and the second side pin opening. The shroud can be configured such that it covers an arc of the pulley from approximately 9 o'clock to approximately 2 o'clock. Although the arc can also range from any two time frames such that the cable 802 is not inhibited in its travel. For example, the arc could span from 1 o'clock to 2 o'clock.

Figure 8D:
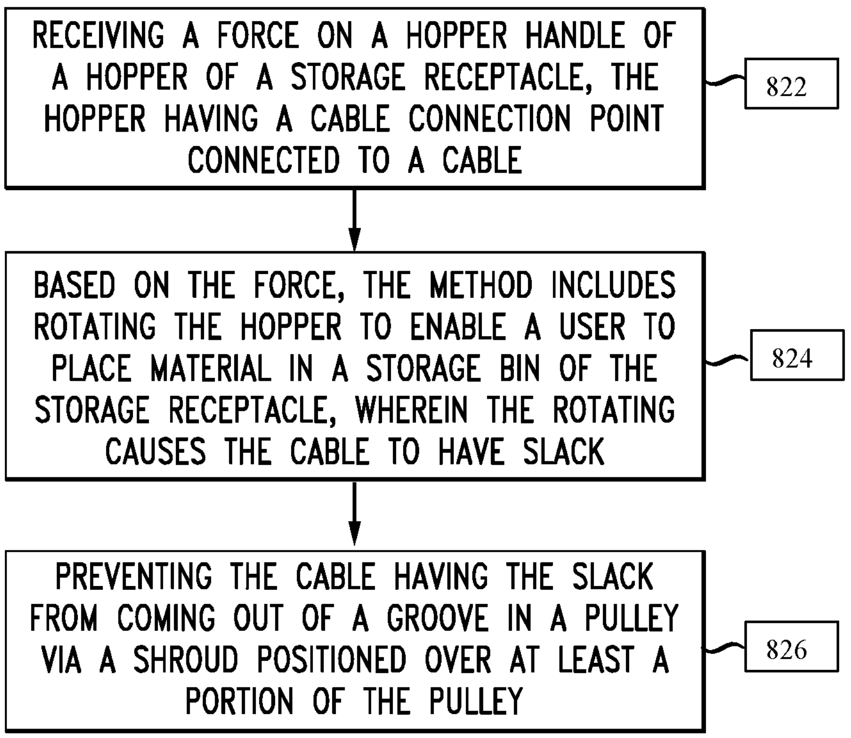
FIG. 8D illustrates a method example relates to use of a shroud.

FIG. 8D illustrates a method 820 aspect using the shroud. The method includes receiving a force on a hopper handle of a hopper of a storage receptacle, the hopper having a cable connection point connected to a cable (822). Based on the force, the method includes rotating the hopper to enable a user to place material in a storage bin of the storage receptacle, wherein the rotating causes the cable to have slack (824) and preventing the cable having the slack from coming out of a groove in a pulley via a shroud positioned over at least a portion of the pulley (826).

Figure 9B:
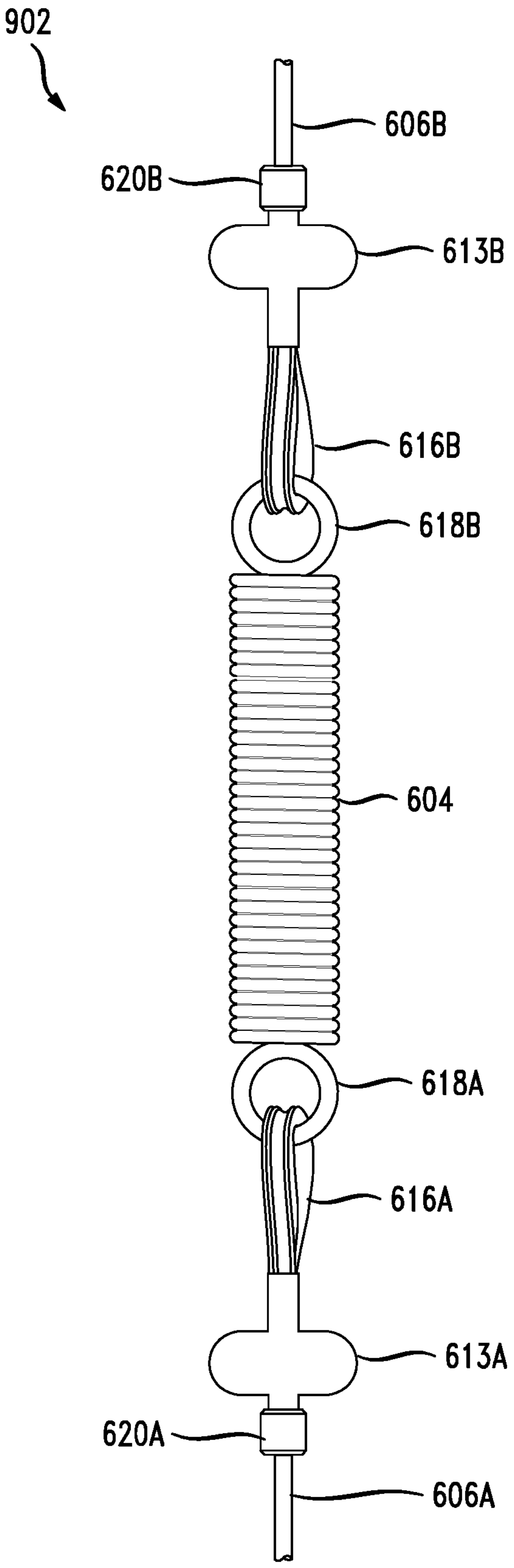

FIGS. 9A and 9B illustrate example cable and spring configurations 900-902. The cables 606A-B can include a spring 604 which can be connected or coupled with the first cable 606A and the second cable 606B via connection elements 616A-B and 618A-B. For example, first cable 606A can include a connection element 616A, such as a hook, a clip, or any attachment or coupling mechanism, which can connect or attach to connection element 618A on one end of the spring 604 in order to secure, attach, couple, or connect the spring 604 and first cable 606A. Similarly, second cable 606B can include a connection element 616B which can connect or attach to connection element 618B on another end of the spring 604 in order to secure, attach, couple, or connect the spring 604 and second cable 606B.

The spring 604 can be configured as a rigid body which can transfer the motion or force of the first cable 606A to the second cable 606B. The spring 604 can also be configured to extend when excessive force is applied to relieve force and limit the force on the system.

The spring 604 can have a predetermined wire size, diameter, and length which can vary based on one or more factors, such as performance, application, size or characteristics of the door 600, size or characteristics of the pedal 605, size or characteristics of the pedal structure 614, size or characteristics of the cables 606A-B, size or characteristics of the pulleys 608-602, and/or size or characteristics of the system 300. For example, the spring 604 can have a wire size between 0.05" and 0.1", a diameter between 0.4" and 0.8", and a length between 3.5" and 15".

In some examples, the spring can have a wire size of approximately 0.08"-0.096", a diameter of approximately 0.5"-0.80" and a length of approximately 5"-12". In other examples, the spring 604 can have a wire size of approximately 0.070"-0.075" (e.g., 0.072"), a diameter of approximately 0.56"-0.80" (e.g., 0.58"), and a length of approximately 3.8"-4.2" (e.g., 4.0").

In additional examples, the spring 604 can have a wire size of approximately 0.08"-0.096"(e.g., 0.091"), a diameter of approximately 0.73"-0.77" (e.g., 0.75"), and a length of approximately 6.2"-6.8" (e.g., 6.5"). In still other examples, the spring 604 can have a wire size of approximately 0.089"-0.093" (e.g., 0.091"), a diameter of approximately 0.63"-0.67" (e.g., 0.65"), and a length of approximately 10"-13" (e.g., 11"). In some cases, the larger wire size, diameter, and/or length may result in better performance and/or reliance. However, this can depend on one or more factors, as previously explained, such as application and/or size or characteristics of one or more components in the system 300. Values outside of these ranges can be used as well.

The wire size, diameter, and/or length of the spring 604 can be adjusted to improve a performance or durability of a specific application of the spring 604. For example, if the diameter is limited in a specific application due to one or more factors, such as a size of the door 600 or fitting constraints, the length and/or wire size of the spring 604 can in turn be adjusted to optimize the spring 604. To illustrate, in some applications, the diameter of the spring 604 may be limited to allow the spring 604 to fit into the front of the door 600. In this case, the length of the spring 604 can be increased to improve the performance and/or reliability of the spring given the limited diameter. On the other hand, if the diameter can be increased in a specific application of the spring 604, the length of the spring 604 may in turn be reduced to improve or maintain the performance and/or reliability of the spring 604.

To open door 600, force can be applied on the cables 606A-B to get the door 600 to start opening. As the door 600 opens, the force can decrease until the door 600 is fully open, at which point the spring 604 can limit or reduce the force needed to keep the door 600 in the open position. Depressing the pedal 605 can cause the cables 606A-B to be pulled. As the pedal 605 is depressed, the spring 604 can extend until it has built up enough extension to store enough force to start the door 600 opening. In some cases, this occurs when the pedal 605 is depressed half way (or more) with respect to the predetermined range of motion of the pedal 605. As the door 600 begins to open, the spring 604 can retract until the hopper is fully open. At that point the spring 604 has retracted, allowing the pedal structure 614 to transfer the motion of the pedal 605 to open the door 600.

In some configurations, the spring 604 can be sized so that when it is fully or near fully extended, the spring 604 has more than the force required to open the door 600. Moreover, at full or near full retraction, the spring 604 can have enough force to keep the door 600 in the open position. By storing energy in the spring 604, the speed at which the pedal 605 and/or pedal structure 614 can open the door 600 can be limited or reduced. For example, in some cases, even if a user stomps on the pedal 605 as hard as possible, will result in very slow motion of the hopper.

The spring 604 can be inserted inline with the cables 606A-B. Moreover, the spring 604 can be sized so that during normal or expected operation of the door 600, the pre-tension on the spring 604 can be such that the force (e.g., expected force, maximum force, maximum expected force, average force, predicted force based on statistical data or historical data, calculated force based on expected weight and/or strength levels of a user, a threshold force, etc.) seen during normal operation does not extend the spring. During abnormal operation where the door 600 is constrained from moving, locked, jammed, etc., the spring 604 can extend out. During maximum or near maximum extension, the spring can allow a load on the components in the system (e.g., door 600, pedal structure 614, pulley 608, cables 606A-B, etc.) that keeps stress load levels below a threshold level that may cause a failure with the system and/or components. The threshold level can be based on the materials of the various components, the size and/or configuration of the components, load or force capacity of one or more of the components, etc.

The length of the cable 606A and/or 606B can be adjusted to change the amount of pre-load on the spring 604, which can also affect the performance characteristics of the pedal 605 and/or pedal structure 614. For example, the length of the cable 606A and/or 606B can be adjusted to change the amount of pre-load on the spring 604 and vary the amount of force necessary to start the door 600 opening. To illustrate, the length of the cable 606A and/or 606B can be adjusted to a length that ensures that at least 15 pounds of force are necessary to start the door 600 opening. In this way, the amount of force for starting the door 600 opening can be adjusted as needed based on the length of the cable 606A and/or 606B. Thus, in some cases, the length of the cable 606A and/or 606B can be adjusted to a length that would ensure that, for example, at least 1 pound, 2 pounds, 5 pounds, 10 pounds, or 20 pounds of force exerted on the cables 606A-B, the spring 604, the pedal 605, and/or the pedal structure 614, are necessary to start the door 600 opening.

For example, the length of cable 606A and/or 606B can be shortened such that a pre-load is added to the spring 604 so that the spring 604 has a pull or force (e.g., 1 pound, 2 pounds, 5 pounds, 10 pounds, etc.) even prior to the pedal 605 being depressed or any force being applied through the pedal structure 614. The cable 606A and/or 606B can be shortened so that the spring 604 maintains a starting or stored pull or force. This can result in an adjusted pedal 605 travel (e.g., more or less pedal travel or movement) required or used to start opening the door 600.

The configuration 900 can also include bumpers 612A-B. The bumpers 612A-B can be coupled to the cables 606A-B to protect the spring 604 from hitting or rubbing other components when the spring 604 and/or the cables 606A-B moves or travels when opening or closing the door 600. For example, the bumpers 612A-B can ensure that the spring 604 does not contact system components, such as sheet metal of the door 600 or the pedal structure 614, to prevent or limit damage to the spring 604 and/or noise resulting from contact or rubbing of the spring 604 to other materials or components. The bumpers 612A-B can also reduce any rattle that would otherwise result from rubbing or hitting the spring 604 on other system components or materials.

The bumpers 612A-B can be rigid, semi-rigid, shock absorbent, noise reducing, and the like. For example, the bumpers 612A-B can include rubber, plastic, foam, leather, fabric, other shock absorbent materials and the like. The bumpers 612A-B can also be configured with a filling material that provides semi-rigid, shock absorbent, and/or noise reduction characteristics, such as air, water, foam, rubber, fabric, etc.

The bumpers 612A-B can be sized to have a same or larger diameter than the spring 604. This can ensure that the bumpers 612A-B will contact other materials or components prior to the spring 604. Moreover, this can protect the spring 604 and deaden noise or rattle that would result from the spring 604 coming into contact with other components or materials. The bumpers 612A-B can be loose on the cables 606A-B to allow for some movement of the bumpers 612A-B within a limited area of the cables 606A-B. In some cases, the bumpers 612A-B can be coupled with the cables 606A-B by extending or piercing the cables 606A-B through the bumpers 612A-B.

Further, the bumpers 612A-B can be constrained in an area within the cables 606A-B and respectively below and above the spring 604 by stops 620A-B. The stops can be securely attached to the cables 606A-B to stop movement or travel of the bumpers 612A-B. The bumpers 612A-B can be shaped as a square, rectangle, triangle, or any other shape. In some cases, the bumpers 612A-B can have a taper to minimize dragging as the cables 606A-B is pulled.

Referring to configuration 902 shown in FIG. 9B, the bumpers 613A-B can also vary in shape. For example, the bumpers 613A-B can be circular, rectangular, etc.

Figure 9C:
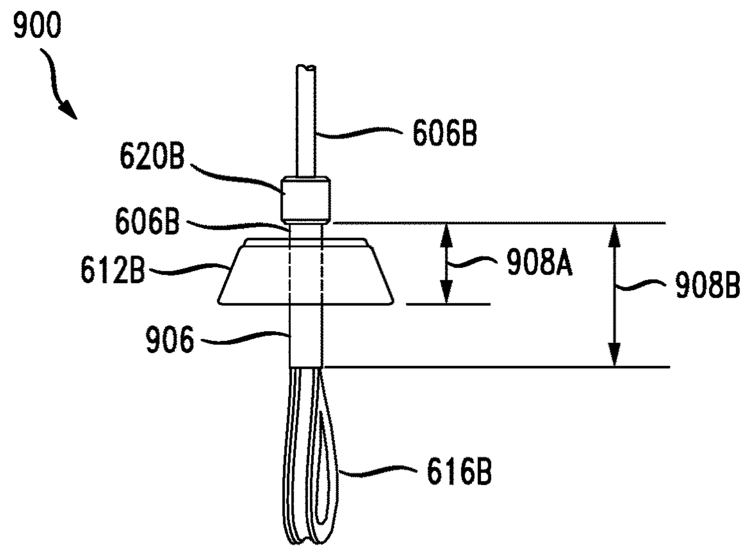

FIG. 9C illustrates an example configuration 904 for connecting the spring 604 with top cable 606B. The top cable 606B can include a bumper 612B residing above a connection element 616B. In some cases, the bumper 612B can be inserted into the top cable 606B by extending a portion of the top cable 606B through an opening in the bumper 612B or piercing the bumper 612B with the top cable 606B to allow a portion of the top cable 606B to pass through an opening on the bumper 612B.

The connection element 616B can be part of the top cable 606B or a separate component or material secured, attached, or coupled with the top cable 606B. Moreover, the connection element 616B can be configured for attaching, connecting, securing, coupling, snapping in, and/or clipping the top cable 606B with a complementary or corresponding connection element on the spring (not shown). The connection element 616B can include, for example, a hook, a clip, an attachment, a belt, and the like.

The connection element 616B can include an area 906 between the connection element 616 and the bumper 612B. The area 906 can be a space that allows movement or traveling by the bumper 616 within the top cable 606B. The area 906 can also be a point where the connection element 616B is secured or attached to the top cable 606B. In some cases, the area 906 can serve as a stop for the bumper 612B which can prevent the bumper from moving below the area 906.

The top cable 606B can include a stop 620B which can prevent the bumper 612B from moving or traveling up the top cable 606B beyond the location where the stop 620B is secured or attached to the top cable 606B.

In some cases, the bumper 612B can be loosely fit on the top cable 606B to allow for some room or movement of the bumper 612B. For example, in some cases the bumper 612B can travel within area 908A between the stop 620B and area 906. Here, the area 906 can serve as a stop that prevents the bumper 612B from moving below the area 906. In other examples, the bumper 612B can travel or move within area 908B between stop 620B and the connection element 616B. The bumpers can be loose on the cable, constrained in the area above and below the spring by stops 620B in the cable 606B. The bumper 612B has a taper which minimizes dragging as the pedal cable 606B is opened and closed.

Figure 9D:
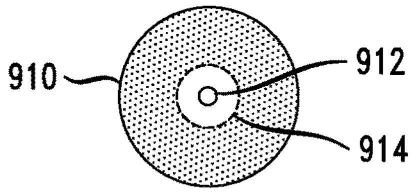
Figure 9E:
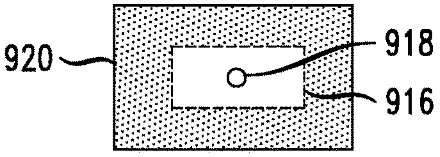
Figure 9F:
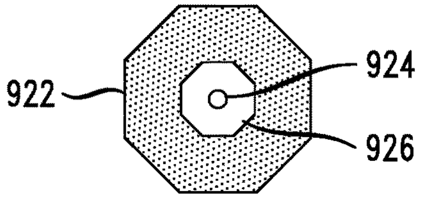

FIGS. 9D-F illustrate a top view of example bumpers, such as bumper 612B. Referring to FIG. 9D, bumper 910 can be a round bumper. The bumper 910 can include an opening 912 for inserting the top cable 606B. In some cases, the opening 912 can be located within a centralized location 914.

Bumper 916 can be a square bumper with an opening 918 for inserting the top cable 606B. Bumper 922 can be an octagon shape similarly configured with an opening 924 for inserting the top cable 606B. Openings 918 and 924 can be located within respective centralized locations 920 and 926. These figures demonstrate some example shapes of the bumpers but other shapes are contemplated as well, such as cylindrical, pyramidal, cubic, spherical, asymmetrical, bone-shaped, and so forth. The different bumpers can have different shapes and/or be made from different materials as well.

In another example, the bumper could be a rubber, plastic, or other material that is positioned around the spring. For example, a sock-like structure could slide over the spring that can be made of rubber or another material. Such a structure would cushion the spring. The spring could also be dipped into a heated rubber mixture which, after drying, would provide a rubber covering over the spring to provide the cushioning.

Figure 10:
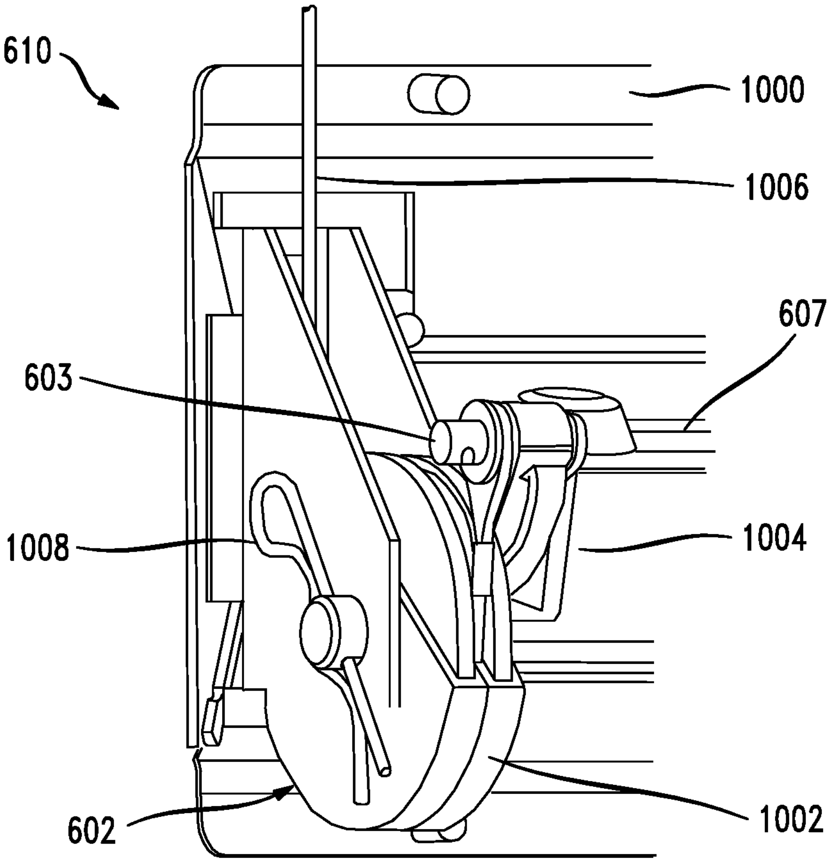
FIG. 10 illustrates a rear view of a pedal with its associated pulley system for a hands free interface.

FIG. 10 illustrates a back view of the foot pedal 1000. The foot pedal 1000 can include a pulley 1004 for pulling the cable 1006 in order to open and close the door on the receptacle. The pulley can include a pulley shroud 1002 to cover the pulley and prevent the cable 1006 from becoming dislodged. Moreover, the foot pedal 1000 can include a pin 1008 to lock the pulley 1004 and foot pedal 1000 into place.

Foot Pedal and Frame Structure

Figure 11A:
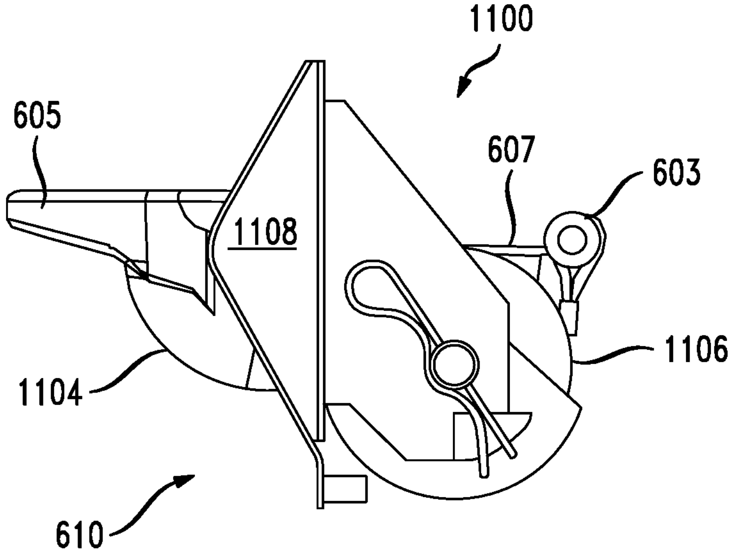
FIG. 11A illustrates a normal position of a pedal for a hands free interface.
Figure 11B:
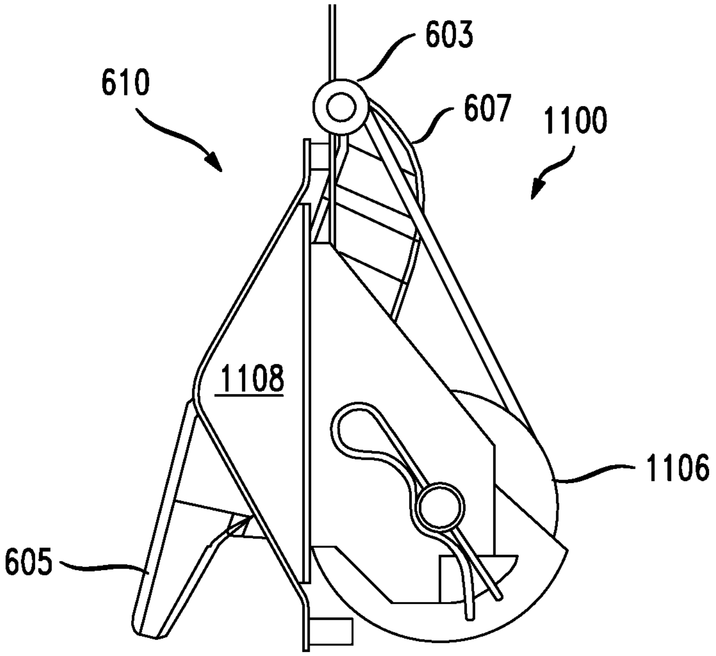
FIG. 11B illustrates a downward position of a pedal for a hands free interface.

FIGS. 11A and 11B illustrate a foot pedal 605 and pulley system 1106. In FIG. 11A, the foot pedal 605 is in its normal position prior to receiving force (e.g., before a user steps on the pedal). In FIG. 11B, the foot pedal is shown in a down position once force has been applied to the foot pedal (e.g., a user has stepped on the pedal) in order to open the door on the receptacle. The foot pedal 605 can rotate downwards to pull the cable through the pulley system 1106 in order to open the door on the receptacle. In some cases, the pedal can include a curved underside 1104 to prevent catching and sticking on snow or other debris that may collect under the pedal. The curved underside can have a partial cylindrical shape. The pedal can include a curved profile to deflect impact from snow removal equipment or similar machinery. The pedal can also be curved to prevent jamming or sticking with the floor or other materials. In some cases, the pedal and/or the door can include a lock to maintain the pedal in a downward position for a period of time. For example, the lock can allow the door to stay open for a period of time without the user having to maintain pressure on the foot pedal. FIGS. 11A and 11B also show a portion of a frame 1108 which shall be discussed below in more detail.

Figure 11C:
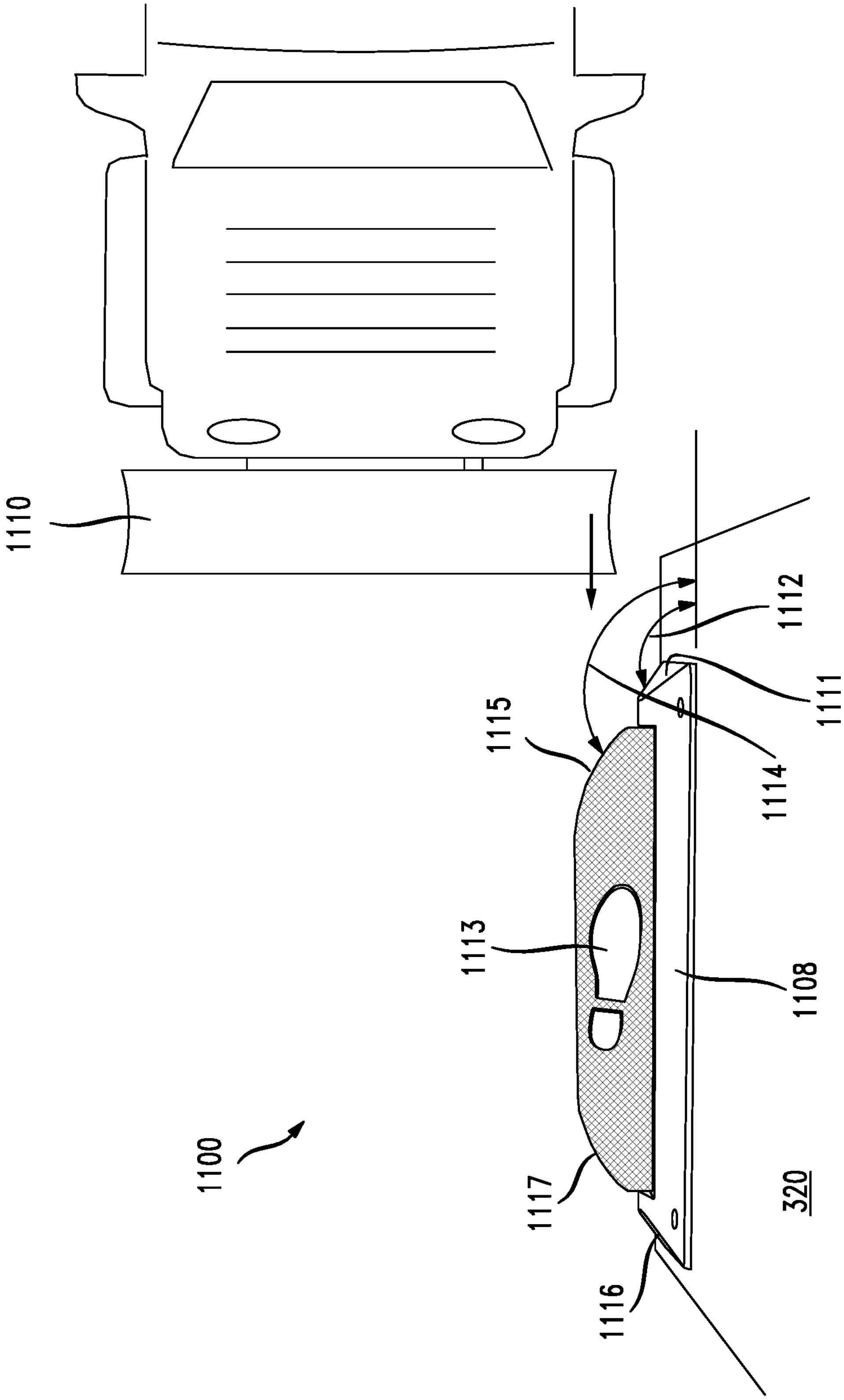
FIG. 11C illustrates a top view of the pedal and frame structure.

FIG. 11C illustrates another aspect of the foot pedal. This aspect involves the structure between a foot pedal frame 1108 and the foot pedal itself 605. One problem that arises in use of the container 300 on a street is that during snowstorms, snow will fall around the container 300. If the container is on a city street, the city may then plow the streets and come close to the container 300. Feature 1110 represents a plow moving from right to left. If the plow 1110 continues along the same path, it will impact the surface 1110 of the frame 1108. The angles 1112 and 1114 are designed to enable the plow 1110 to slip or slide across the surface 1111 and the side of the pedal 605. It is preferred that angle 1112 and/or angle 1114 both be 45 degrees although other angles are contemplated. With the angles 1112 and 1114 being greater than 90 degrees, the plow 1110 will slide along those surfaces rather than catch the frame 1108 and/or the pedal 605 and damage or move the container 300. The angles 1112 and 1114 can be the same as is shown in FIG. 11C or they may be different as in FIG. 11E. The angle 1118 in figure FIG. 11E is greater than the angle 1112. Thus, the plane 1120 defined by the surface 1111 differs from the plane 1122 defines along the surface 1124 of the foot pedal 605. The greater angle 1118 is designed to allow the plow 1110 to more easily slide along the surfaces rather than catch either the frame 1108 and the foot pedal 605.

Figure 11D:
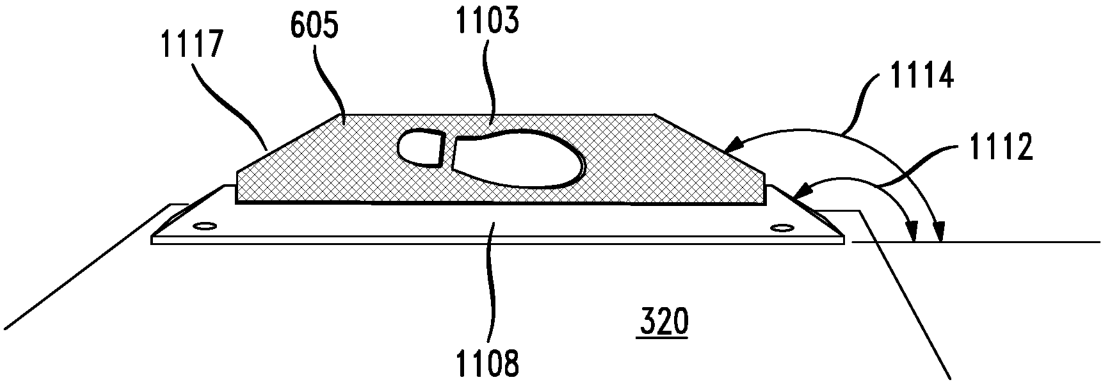
FIGS. 11D and 11E illustrate various shapes and angles for the pedal structure.
Figure 11E:
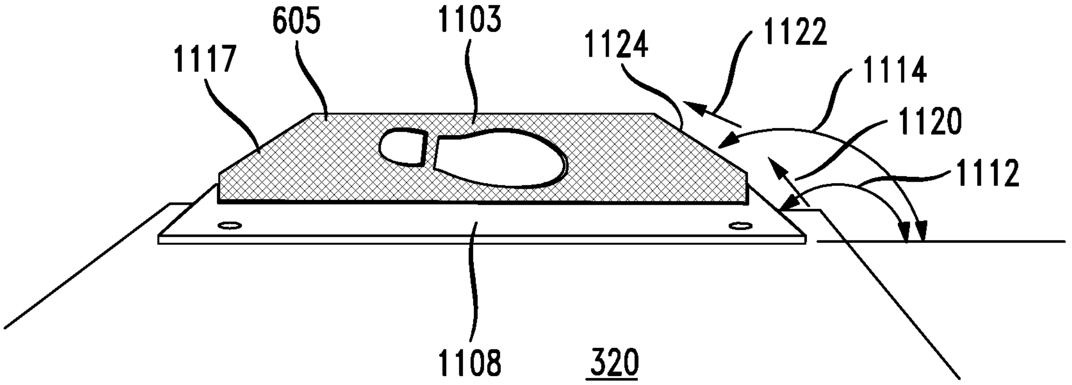

With reference to FIGS. 11C, 11D and 11E, the apparatus includes a frame 1108 attached to a side wall 320 of a container 300. The frame 1108 has a frame side surface 1111 configured to be at a first angle 1112 relative to the side wall 320 of the container 300 that is greater than 90 degrees and the frame side surface defining a plane 1113 extending from the frame side surface. A foot pedal 605 is rotatably configured within the frame 1108 and has a foot pedal surface 1103 configured to be stepped on by a user. The foot pedal 605 has a foot pedal side surface 605 configured to be one of (1) at least in part substantially within the plane 1113 extending from the frame side surface 1111 and at the first angle 1112 relative to the side wall 320 of the container and (2) at least in part at a second angle 1114 which is greater than the first angle relative to the side wall of the container.

The apparatus can be a trash compactor. The first angle 1112 can be between 100 and 140 degrees and the second angle 1114 can be also between 100 and 140 degrees. Any angle between 90 degrees and 180 degrees is contemplated as within the scope of this disclosure. The first angle and the second angle can be substantially the same. In one aspect, only a portion of the foot pedal side surface 1115 is (1) at least in part substantially within the plane 1113 extending from the frame side surface and at the first angle 1112 relative to the side wall 320 of the container or (2) at least in part at a second angle 1114 which is greater than the first angle 1112 relative to the side wall 320 of the container 300.

FIG. 11C shows a tapering of the side surface 1115. In this aspect, the foot pedal side surface 1115 tapers from a first end which is most distant from the side wall of the container 300 and which is substantially within the plane extending from the frame side surface 1111 to a second end which is closest to the frame 1108. A second side surface 1117 of the foot pedal 605 is also shown as tapered. FIG. 11D shows the feature 1117 in which the second side surface of the foot pedal 605 is substantially straight. The shape of this side surface can vary depending on the conditions in which the receptacle will operate.

The frame 1108 can include a second frame side surface 1116 on an opposite end of the side surface 1111 of the frame 1108, the second frame side surface 1116 having a mirrored configuration to the frame side surface 1111. In another aspect, the frame side surfaces 1111, 1116 can have different angles or be configured differently and not have mirrored configurations.

Figure 11F:
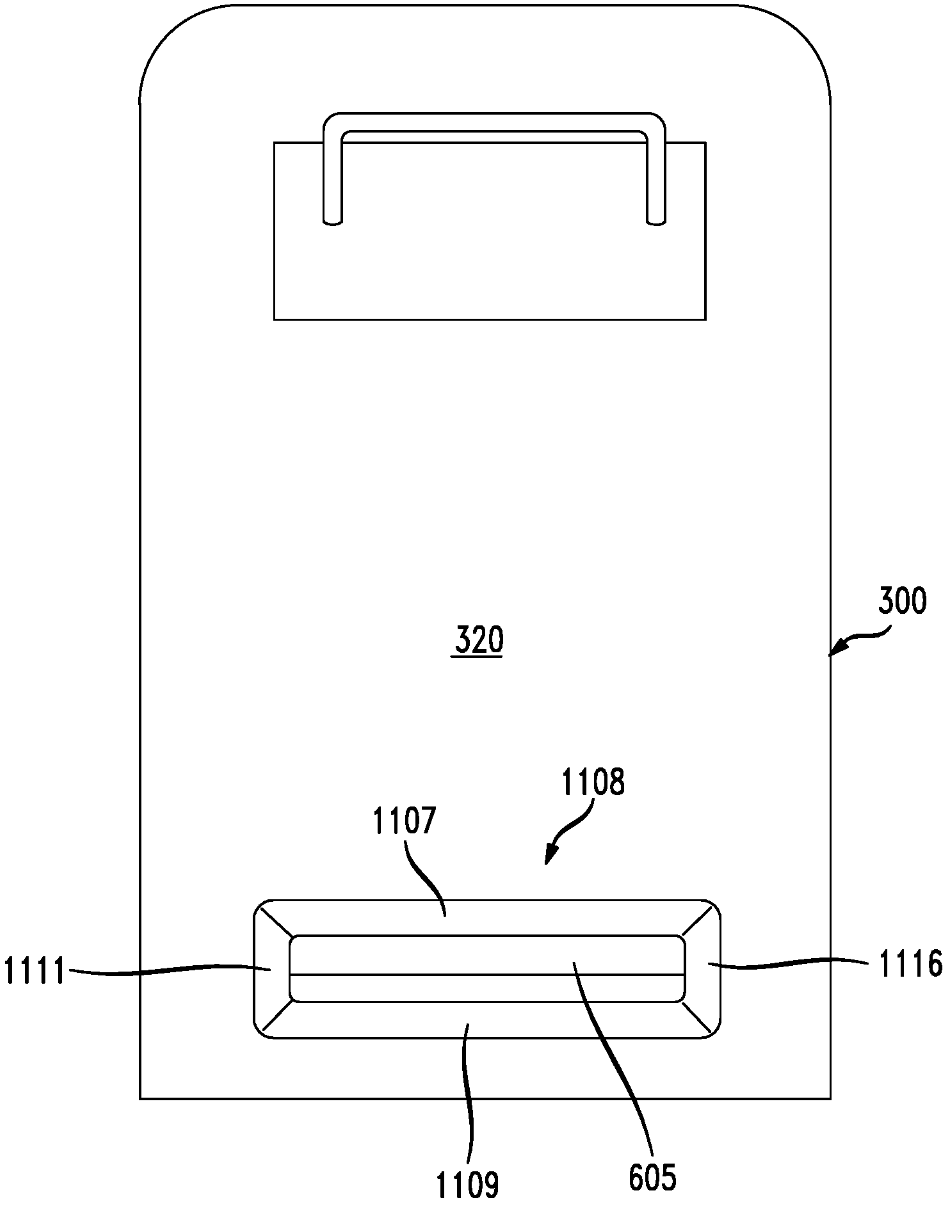
FIG. 11F illustrates a front view of the pedal and frame.

FIG. 11F shows the frame 1108 with a top surface 1107 and a bottom surface 1109 each configured to be at an angle which is greater than 90 degrees from the side wall 320 of the container 300. As the purpose of the surface 1111 is to enable a snow plow to slip off more easily if it impacts the surface 1111 of the frame 1108, the configuration of surfaces 1107 and 1109 is less important to this function. Accordingly, the structure of these surfaces can vary. As shown in FIG. 11F, the frame 1108 is positioned at a lower portion of the side wall 320.

In another aspect, the concept covers a compactor 300 having a side wall 320, the compactor including a frame 1108 attached to the side wall 320, the frame 1108 having a frame side surface 1111 configured to be at a first angle 1112 relative to the side wall 320 that is greater than 90 degrees and the frame side surface 1111 defining a plane 1113 extending from or along the side surface 1111. A foot pedal 605 is rotatably configured within the frame 1108 and has a foot pedal surface 1103 configured to be stepped on by a user. The foot pedal 605 has a foot pedal side surface 1115 configured to be one of (1) at least in part substantially within the plane 1113 extending from the frame side surface 1111 and at the first angle 1112 relative to the side wall 320 and (2) at least in part at a second angle 1114, 1118 which is greater than the first angle 1112 relative to the side wall 320 of the container 300. The foot pedal 605 can have a lower surface having a partial cylindrical shape.

Further example aspects of the foot pedal and frame structure follow. An apparatus 1100 includes a frame 1108 attached to a side wall 320 of a container, the frame having a frame side surface 1111 configured to be at a first angle 1112 relative to the side wall of the container that is greater than 90 degrees and the frame side surface defining a plane extending from the frame side surface 1111. A foot pedal 605 can be rotatably configured within the frame 1108 and having a foot pedal surface 1113 configured to be stepped on by a user, wherein the foot pedal 605 has a foot pedal side surface 1115 configured to be one of (1) at least in part substantially within the plane extending from the frame side surface and at the first angle relative 1112 to the side wall 320 of the container and (2) at least in part at a second angle 1114 which is greater than the first angle 1112 relative to the side wall 320 of the container. The first angle 1112 can be between 100 and 140 degrees. In one aspect, the first angle 1112 and the second angle 1114 are substantially the same. In another aspect, the two angles are different. In one example, only a portion of the foot pedal side surface 1115 is (1) at least in part substantially within the plane extending from the frame side surface and at the first angle 1112 relative to the side wall 320 of the container or (2) at least in part at a second angle 1114 which is greater than the first angle relative to the side wall 320 of the container.

The shape of the foot pedal can also vary. The foot pedal side surface 1115 can taper from a first end which is most distant from the side wall 320 of the container and which is substantially within the plane extending from the frame side surface to a second end which is closest to the frame 1108. The frame 1108 can include a second frame side surface 1116 on an opposite end of the frame, the second frame side surface 1116 having a mirrored configuration to the frame side surface. The two sides also may not be mirrored by completely different shapes. The frame 1108 can include a top surface and a bottom surface each configured to be at an angle which is greater than 90 degrees from the side wall 320 of the container. The foot pedal 605 can also include a bottom surface having a partial cylindrical shape 1104. When the user depresses the foot pedal 605, the foot pedal 605 can rotate and causes a hopper 600 of the container 300 to open. The frame 1108 is preferably positioned in a lower portion of the side wall 320.

In another aspect, a compactor 300 can include a side wall 320, a frame 1108 attached to the side wall 320, the frame 1108 having a frame side surface 1111 configured to be at a first angle 1112 relative to the side wall that is greater than 90 degrees and the frame side surface defining a plane extending from the side surface 1111. A foot pedal 605 can be rotatably configured within the frame 1108 and having a foot pedal surface 1113 configured to be stepped on by a user, wherein the foot pedal 605 has a foot pedal side surface 1115 configured to be one of (1) at least in part substantially within the plane extending from the frame side surface 1111 and at the first angle 1112 relative to the side wall and (2) at least in part at a second angle 1114 which is greater than the first angle 1112 relative to the side wall 320 of the container.

Energy Reclamation Systems

Another aspect of this disclosure is energy reclamation. The compactor 300 in this disclosure is a solar-powered compactor. However, when the sun is not out because of clouds or because of the location of the compactor, it can have less than optimal functionality because of a lack of energy. One aspect that can provide an improvement to energy management is to reclaim energy that otherwise would be lost through users of the compactor moving the hopper and/or using the foot pedal.

Figure 12A:
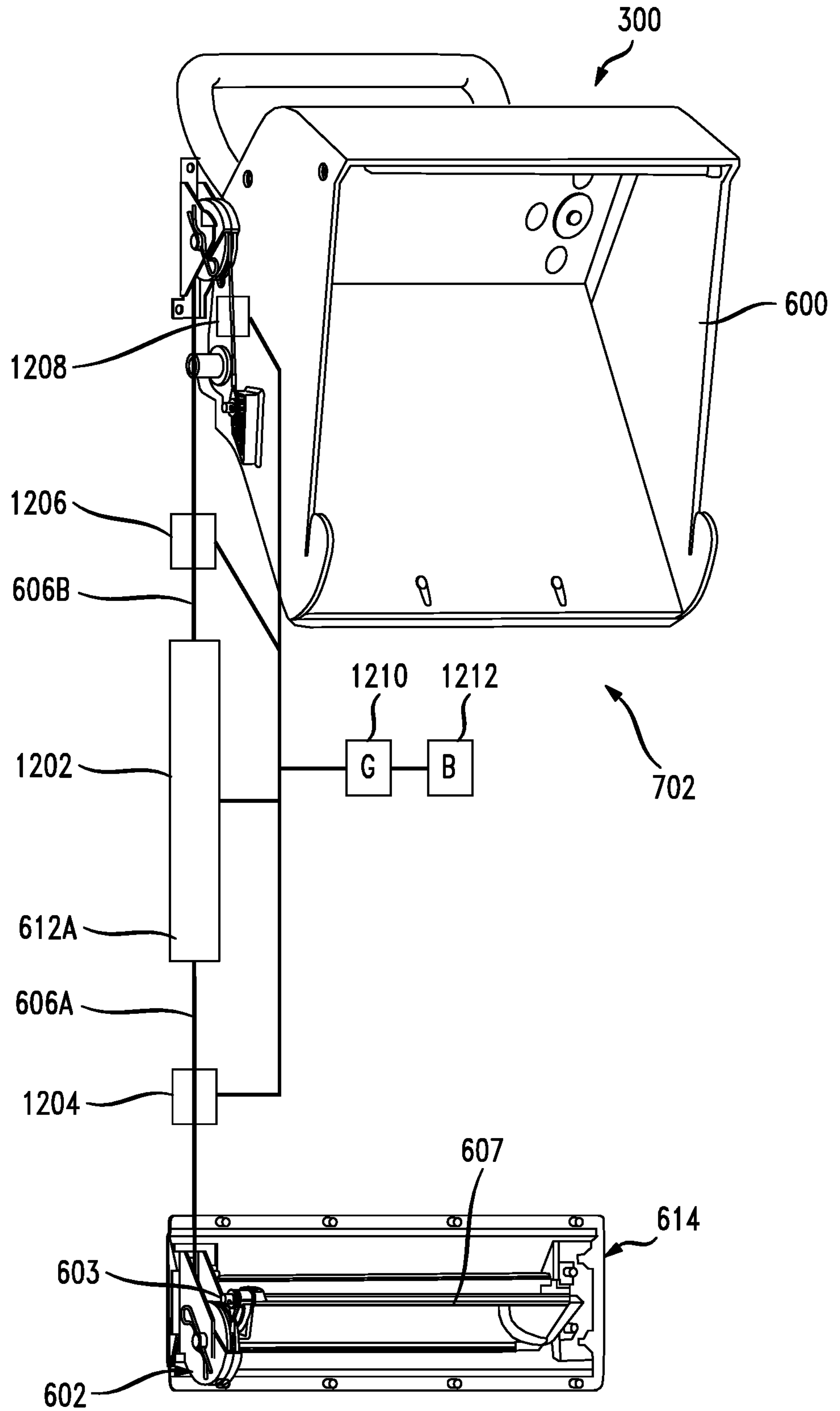
FIG. 12A illustrates a general energy reclamation structure.

FIG. 12A shows several potential opportunities for energy reclamation. Features 1202, 1204, 1206 and 1208 show several example locations which involve movement of the cables 606A-B during operation. For example, when a user steps on the foot pedal, cables 606A-B is pulled downward causing the hopper 600 to open. Disclosed above was a spring mechanism to manage the downward motion to avoid injury and to cushion the movement. In this example, the spring can be replaced with an energy reclamation unit 1202 that will convert the mechanical motion into electricity. Shown in FIG. 12A is communication between the various points where mechanical energy and be communicated to a generator 1210 which converts the energy into electricity which is stored in the battery 1212 of the compactor. One or more units 1202, 1204, 1206, 1206 could be positioned where shown or in other locations with the compactor that are effected by movement when it is used (i.e, the hopper is opened or the pedal is stepped on). One or more of these locations can convert the movement into electricity.

Figure 12B:
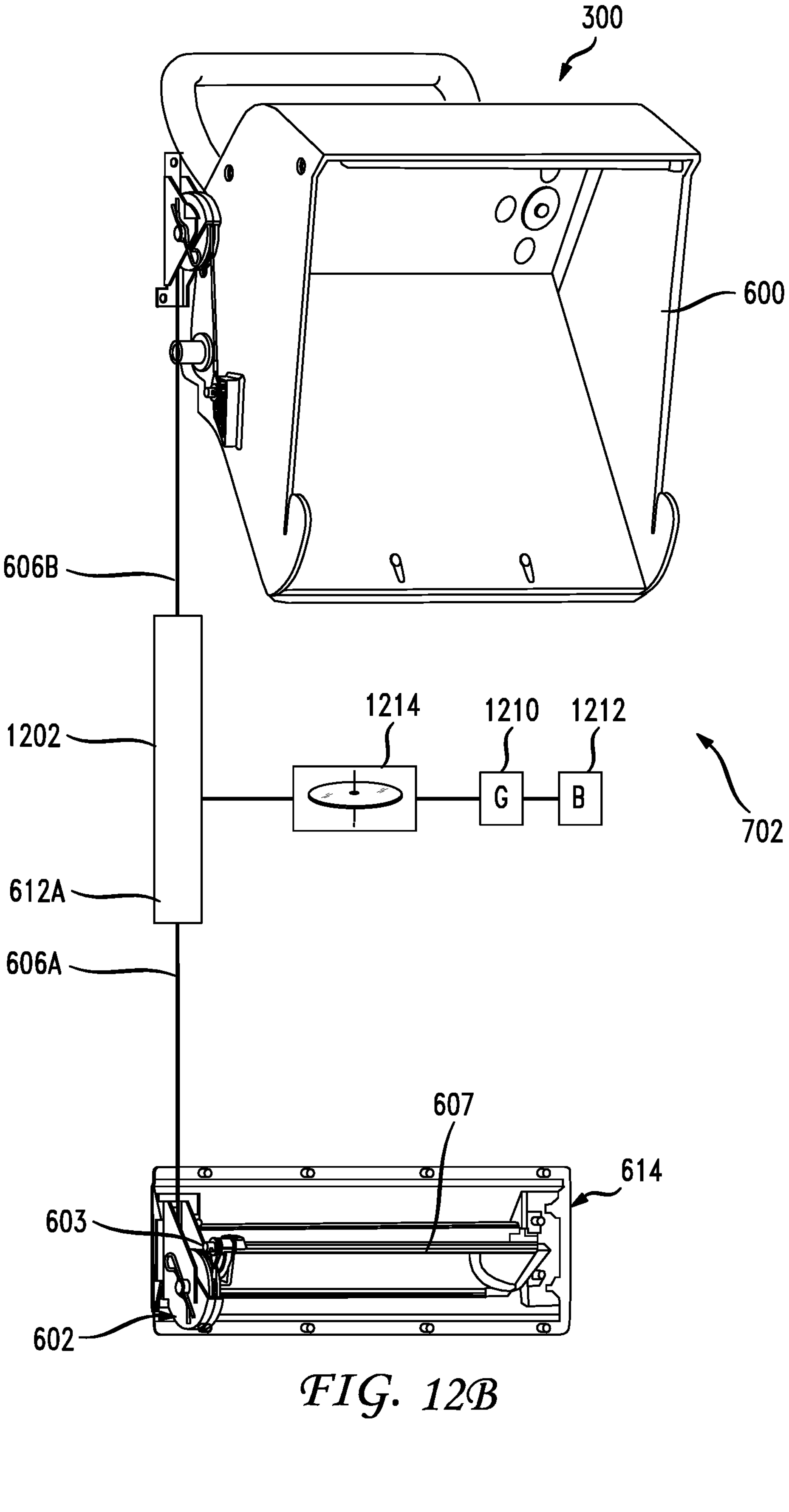
FIG. 12B illustrates an alternate energy reclamation structure.

The manner of this conversion can take any form. For example, FIG. 12B illustrates a structure 1202 which would include components that, when a user steps on the foot pedal and the foot pedal structure 610 causes the cables 606A-B to pull down, will cause mechanical motion from the cables 606A-B to be transferred to a flywheel 1214. Flywheels are known to store energy as the flywheel rotor spins. Thus, through gears or other mechanisms, the movement of cables 606A-B will result in a spinning flywheel 1214. The flywheel 1214 can act as a generator in once aspect or be in communication with a generator 1210. In either case, the flywheel motion which will continue through inertia once it gets spun up, can convert that motion into electrical energy through known methods. Such flywheels have a rotor suspended in bearings (which can be magnetic) inside a vacuum chamber to reduce friction. In one aspect of this disclosure, a compactor includes a foot pedal mechanism 610 attached to a side wall 320 of the compactor 300, the foot pedal mechanism 610 configured, when a force is provided on a foot pedal, to cause a cables 606A-B attached to the foot pedal mechanism to move from an up position to a down position via a cable motion. A converter 1202/1214/1210 associated with cable that converts the cable motion into electricity. A battery 1212 in communication with the converter stores the electricity.

In one aspect, the converter 1202/1214/1210 includes a mechanism for transferring the cable motion energy into energy for spinning up a flywheel 1214 that then is used to generate electricity.

The compactor 300 can include several converters positioned at different locations along the cables 606A-B, each of which can provide some additional energy to the battery. A converter could also be position at a pulley location in the compactor to take advantage of the rotational energy that is available when the hopper moves or the foot pedal is stepped on. An axis of a pulley could be mechanically connected to a flywheel with appropriate gearing such that the strong rotational motion that results from a person opening the hopper or stepping on the pedal is transferred to spinning the flywheel, which can then convert that spinning flywheel motion into electricity to help power the compactor.

In another aspect of this disclosure, a compactor includes a hopper 600 for receiving materials into the compactor 300. The hopper 600 is in mechanical communication with a converter 1208 such that when the hopper 600 is opened by a user, mechanical movement of a portion of the hopper 600 causes the converter 1208 to convert mechanical motion into electricity. The compactor includes a battery 1212 in communication with the converter 1208 such that the electricity generated by the converter is stored in the battery 1212. The communication between the hopper 600 and the convert 1208 can be via a movement of a cable, rotation of a pulley, or movement of a surface associated with the hopper 600.

Figure 13:
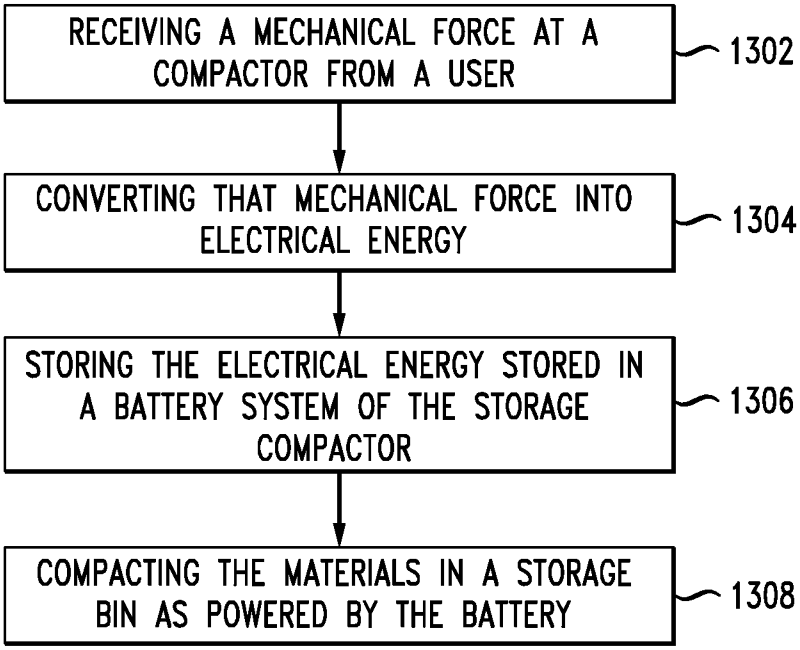
FIG. 13 illustrates a method aspect associated with energy reclamation.

FIG. 13 illustrates a method example related to energy reclamation. The method is practiced by a storage compactor that requires stored energy to operate the compactor at various times when the storage bin is full enough. The method includes receiving a mechanical force from a user (1302). The mechanical force might be the user stepping on the pedal 605 or opening the hopper 600 using handle 610. Each of these forces causes movement in the cabling system or rotation of a component of the system. The method includes converting that mechanical force into electrical energy (1304). This can be accomplished in any number of ways. For example, the system could cause via conversion structure a flywheel to start spinning. The flywheel can include the necessary components to convert the spinning motion of the flywheel into a current that results in increasing the electrical energy stored in a battery system of the storage compactor (1306). In this regard, each time a person uses the storage receptacle, a small amount of electrical energy can be stored in the battery system for when the proper time arrives for compacting the materials in the storage bin.

Another aspect of the method includes receiving a mechanical force from a user via one of the user causing movement of a pedal operation or movement of a hopper in a storage receptacle and translating the mechanical force into movement of one of a cabling system, the hopper, or rotation of a component of the storage receptacle to yield work. The system converts the work into electrical energy and stores the electrical energy in a battery. The system can also detect a level of material in a storage bin of the storage receptacle and when the level of material reaches a threshold value, compact material in the storage bin via a compactor powered by the battery. In one aspect, converting the work into electrical energy is performed via a flywheel or a generator.

The receiving step can include receiving a mechanical force from the pedal operation and the translating step can include translating the mechanical force into movement of the cabling system. In one aspect, the cabling system can include a cable attached at a first end to the pedal and at a second end to a conversion unit, such that upon the pedal operation, the first end of the cable is pulled downward causing work to be performed by the conversion unit resulting in a generator generating electricity. The receiving step can also include receiving a mechanical force from movement of the hopper and the translating then includes translating the mechanical force due to movement of the hopper such that converting the work into electrical energy is a result of movement of the hopper.

In yet another aspect, the translating can mean translating the mechanical force into rotation of a component of the storage receptacle, for example, when the component is a pulley and the converting is done based on the rotation of the pulley.

Another example of the use of energy reclamation includes a compactor including a pedal system, a hopper in mechanical connection with the pedal system and an energy reclamation unit mechanically connected to one of the hopper and the pedal system. A battery can be electrically connected to the energy reclamation unit, wherein upon mechanical movement of one of the pedal system and the hopper which yields work, the energy reclamation unit converts the work into electricity and stores the electricity in the battery. The energy reclamation unit can operate based on movement of a cable which is part of the pedal system. The compactor can further include a compacting unit connected to the battery and a storage bin, wherein upon the storage bin receiving an amount of material above a threshold, the compacting unit compacts material in the storage bin via energy from the battery.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. Various modifications and changes may be made to the principles described herein without following the example examples and applications illustrated and described herein, and without departing from the spirit and scope of the disclosure.

Claim language reciting "at least one of" a set indicates that one member of the set or multiple members of the set satisfy the claim. In other words, the term "at least one of A and B" can be conjunctive or disjunctive. For example, "at least one of A and B" can mean only A, only B, or A and B.

The terms "coupled with" and "coupled to" as used herein refer to any direct or indirect coupling or connection between two or more elements or items.

What is claimed is:

1. An apparatus comprising:

a storage receptacle comprising a storage bin for holding deposited items;

a hopper configured within an opening on a wall of the storage receptacle;

a metal member connected to the hopper; and a pedal connected to the metal member such that when a user interacts with the pedal, the metal member causes the hopper to open.

2. The apparatus of claim 1, wherein the pedal is configured to rotate downward when pressure is applied in order to pull on the metal member coupled to the pedal, the apparatus further comprising:

a spring coupled to the metal member;

a second metal member coupled to the spring and a connection point on the hopper, wherein the metal member, the spring and the second metal member cause the hopper to open when a force applied to the pedal, allowing access to the storage receptacle; and a bottom component coupled to the pedal and configured to translate a first upward pull of the metal member to a downward pull on the spring, wherein the bottom component is configured to translate the downward pull on the spring via the second metal member to a second upward pull on the hopper, whereby when a user steps on the pedal, the spring limits movement of the hopper.

3. The apparatus of claim 2, wherein the metal member comprises a linear actuator.

4. The apparatus of claim 2, further comprising a bumper configured on at least one of the metal member, the second metal member and the spring, the bumper preventing the metal member, the second metal member or the spring from contacting an inner wall of the apparatus during operation.

5. The apparatus of claim 2, wherein the pedal has a curved underside.

6. The apparatus of claim 2, wherein the pedal has a curved profile.

7. The apparatus of claim 2, further comprising a removable service panel.

8. The apparatus of claim 2, wherein the spring has a wire size between 0.08" and 0.096", a diameter between 0.5" and 0.80" and a length between 5" and 13".

9. The apparatus of claim 8, further comprising a computer-readable storage medium having stored therein instructions which, when executed by a processor, cause the processor to perform operations comprising detecting at least one of energy usage or energy requirements.

10. The apparatus of claim 9, the computer-readable storage medium having stored therein instructions which, when executed by a processor, cause the processor to perform operations comprising detecting a user within a proximity of the apparatus via a sensor to yield a detected user, and triggering an automatic opening of the hopper based on the detected user.

11. The apparatus of claim 9, the computer-readable storage medium having stored therein instructions which, when executed by a processor, cause the processor to perform operations comprising receiving an instruction to open the hopper, and sending a signal to an opening mechanism for opening the hopper, the opening mechanism comprising at least one of the metal member, a spool device, or a gear system.

12. The apparatus of claim 1, further comprising at least one of a linear actuator for opening the hopper, a spool device for opening the hopper, or a gear system for opening the hopper.

13. The apparatus of claim 1, wherein the pedal is configured such that when a user steps on the pedal, a connection point connecting the pedal to the metal member causes the metal member to move in an upward direction.

14. The apparatus of claim 1, further comprising a compactor for compacting contents inside of the storage bin.

15. The apparatus of claim 1, further comprising a processor and a photovoltaic panel for powering operations.

16. The apparatus of claim 15, further comprising a receiver and a transmitter for sending and receiving wireless signals.

17. The apparatus of claim 1, further comprising at least one of a proximity sensor for detecting an object's proximity to the apparatus or a push button for initiating an action.

18. The apparatus of claim 1, wherein the hopper is rotated to an open position when a downward force is applied to a pedal.

19. An apparatus comprising:

a storage receptacle comprising a storage bin for holding deposited items;

a wall configured on the storage receptacle;

a hopper configured within an opening on the wall of the storage receptacle;

a first metal member configured inside the apparatus, a first end of the first metal member being connected to the hopper;

a spring connected to a second end of the first metal member;

a foot pedal configured at a bottom portion of the wall and accessible by a user; and a second metal member connected at a first end of the second metal member to the spring and connected at a second end of the second metal member to the foot pedal.

20. The apparatus of claim 19, wherein the first metal member comprises a first linear actuator and the second metal member comprises a second linear actuator.

* * * * *